US010427599B2

(12) United States Patent
Di Trapani et al.

(10) Patent No.: US 10,427,599 B2
(45) Date of Patent: Oct. 1, 2019

(54) SEAT ILLUMINATING SYSTEM

(71) Applicant: COELUX S.R.L., Lomazzo (CO) (IT)

(72) Inventors: Paolo Di Trapani, Cavallasca (IT); Davide Magatti, Capiago Intimiano (IT)

(73) Assignee: COELUX S.R.L., Lomazzo (CO) (IT)

( * ) Notice: Subject to any disclaimer, the term of this patent is extended or adjusted under 35 U.S.C. 154(b) by 0 days.

(21) Appl. No.: 15/551,195

(22) PCT Filed: Feb. 23, 2015

(86) PCT No.: PCT/EP2015/000406
§ 371 (c)(1),
(2) Date: Aug. 15, 2017

(87) PCT Pub. No.: WO2016/134732
PCT Pub. Date: Sep. 1, 2016

(65) Prior Publication Data
US 2018/0029531 A1 Feb. 1, 2018

(51) Int. Cl.
*B60Q 1/00* (2006.01)
*B60Q 3/233* (2017.01)
(Continued)

(52) U.S. Cl.
CPC ............ *B60Q 3/233* (2017.02); *B60Q 3/208* (2017.02); *B60Q 3/43* (2017.02); *B60Q 3/44* (2017.02);
(Continued)

(58) Field of Classification Search
CPC .......... B60Q 3/233; B60Q 3/64; B60Q 3/208; B60Q 3/56; B60Q 3/51; B60Q 3/43;
(Continued)

(56) References Cited

U.S. PATENT DOCUMENTS 3,671,735 A   6/1972  King
4,388,678 A   6/1983  Turner
(Continued)

FOREIGN PATENT DOCUMENTS

EP   0395802 A1   11/1990
EP   0735311 A1   10/1996
(Continued)

OTHER PUBLICATIONS

Emmanuel Berthomme, European International Searching Authority, International Search Report, counterpart PCT Application No. PCT/EP2015/000406, dated Oct. 29, 2015, 4 pages total.
(Continued)

*Primary Examiner* — William J Carter
*Assistant Examiner* — Omar Rojas Cadima
(74) *Attorney, Agent, or Firm* — DiBerardino McGovern IP Group LLC

(57) ABSTRACT

A seat illuminating system (101D) for, in particular sunlight-like, illuminating a target region (144) comprises a seat arrangement (140) having a seat surface (142A). The target region (144) is defined for a person sitting on the seat surface (142A). The seat illuminating system (101D) comprises further a mounting structure (150A) being spatially fixed with respect to the seat arrangement (140); a reflector unit (106) mounted at the mounting structure (150A) and comprising a reflective surface and a luminous layer for homogenously emitting diffuse light at a first color, the luminous layer extending in front of the reflective surface and comprising a visible front area section (110A) of the reflector unit (106). The seat illuminating system (101D) comprises further a light projector (102) mounted at the mounting structure (150A) and configured to generate a light beam (103) adapted in size for comprehensively illuminating the visible front area section (110A) such that at least a portion (Continued)

of the light beam (103) passes through the luminous layer before and after being reflected by the reflective surface, thereby forming an illuminating light beam (103A) at a second color directed onto the target region (144).

26 Claims, 12 Drawing Sheets

(51) Int. Cl.

| | |
|---|---|
| *B64D 11/00* | (2006.01) |
| *F21V 7/00* | (2006.01) |
| *F21V 7/06* | (2006.01) |
| *B60Q 3/82* | (2017.01) |
| *B60Q 3/51* | (2017.01) |
| *B60Q 3/43* | (2017.01) |
| *B60Q 3/44* | (2017.01) |
| *B60Q 3/74* | (2017.01) |
| *B60Q 3/64* | (2017.01) |
| *B60Q 3/208* | (2017.01) |
| *B60Q 3/56* | (2017.01) |
| *B60R 13/02* | (2006.01) |
| *F21V 14/04* | (2006.01) |
| *F21V 9/30* | (2018.01) |
| *F21V 7/05* | (2006.01) |
| *B61D 29/00* | (2006.01) |

(52) U.S. Cl.
CPC ............... *B60Q 3/51* (2017.02); *B60Q 3/56* (2017.02); *B60Q 3/64* (2017.02); *B60Q 3/745* (2017.02); *B60Q 3/82* (2017.02); *B60R 13/02* (2013.01); *B64D 11/00* (2013.01); *F21V 7/0008* (2013.01); *F21V 7/06* (2013.01); *F21V 14/04* (2013.01); *B60R 2013/0287* (2013.01); *B61D 29/00* (2013.01); *B64D 11/003* (2013.01); *B64D 2011/0038* (2013.01); *B64D 2011/0053* (2013.01); *F21V 7/05* (2013.01); *F21V 9/30* (2018.02)

(58) Field of Classification Search
CPC .. B60Q 3/745; B60Q 3/44; B60Q 3/82; B60R 13/02; B60R 2013/02; B60R 2013/0287; F21V 14/04; F21V 7/06; F21V 7/0008; F21V 9/30; F21V 7/05; F21V 7/26; F21V 7/30; F21V 9/02; B64D 11/00; B64D 2011/0053; B64D 2011/0038; B64D 11/003; B61D 29/00; F21S 8/006
USPC ........................................................ 362/1–2
See application file for complete search history.

(56) References Cited

U.S. PATENT DOCUMENTS

| | | | |
|---|---|---|---|
| 5,226,711 | A | 7/1993 | Matsuno et al. |
| 7,494,255 | B2 | 2/2009 | Bryan et al. |
| 8,068,285 | B1 | 11/2011 | Flynn |
| 8,267,557 | B2 | 9/2012 | Vogel et al. |
| 9,217,553 | B2 * | 12/2015 | Medendorp, Jr. ...... F21V 7/0008 |
| 2005/0046977 | A1 * | 3/2005 | Shifman ............... G02B 17/061 |
| | | | 359/853 |
| 2008/0012728 | A1 * | 1/2008 | Heym ................. B64D 11/0015 |
| | | | 340/945 |
| 2008/0198572 | A1 | 8/2008 | Medendorp |
| 2011/0176314 | A1 | 7/2011 | Chuang |
| 2011/0216542 | A1 * | 9/2011 | Di Trapani ............ G02B 6/001 |
| | | | 362/311.01 |
| 2013/0235572 | A1 | 9/2013 | Aurongzeb et al. |
| 2014/0034806 | A1 * | 2/2014 | Vincen ............... G03B 21/2086 |
| | | | 250/205 |
| 2014/0313751 | A1 | 10/2014 | Abel |

FOREIGN PATENT DOCUMENTS

| | | |
|---|---|---|
| EP | 1179515 A1 | 2/2002 |
| GB | 2450192 C | 12/2005 |
| JP | H04129856 A | 4/1992 |
| JP | H0683479 U | 11/1994 |
| JP | 2009099525 A | 5/2009 |
| JP | 2012017090 A | 1/2012 |
| WO | 2004099666 A2 | 11/2004 |
| WO | 2006129268 A2 | 12/2006 |
| WO | 2007107903 A1 | 9/2007 |
| WO | 2009156347 A1 | 12/2009 |
| WO | 2009156348 A1 | 12/2009 |
| WO | 2012113085 A1 | 8/2012 |
| WO | 2013102862 A1 | 7/2013 |
| WO | 2014018169 A1 | 1/2014 |
| WO | 2014058748 A1 | 4/2014 |
| WO | 2014075721 A1 | 5/2014 |
| WO | 2014076656 A1 | 5/2014 |
| WO | 2015172794 A1 | 11/2015 |
| WO | 2015172821 A1 | 11/2015 |

OTHER PUBLICATIONS

Emmanuel Berthomme, European International Searching Authority, International Preliminary Report on Patentability, counterpart PCT Application No. PCT/EP2015/000406, dated Feb. 10, 2017, 6 pages total.
Standard Terminology of Appearance, ASTM International, Designation: E284-09a, downloaded Feb. 2012, pp. 1-23 (23 total pages).
Office Action, counterpart Japanese Patent Application No. 2017-544746, dated May 15, 2018, 4 pages total (including English translation of 2 pages).

\* cited by examiner

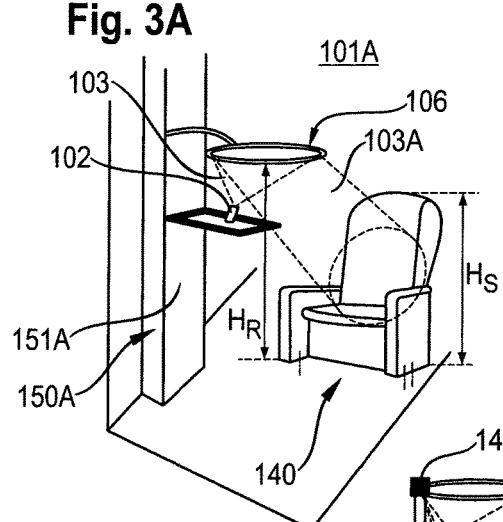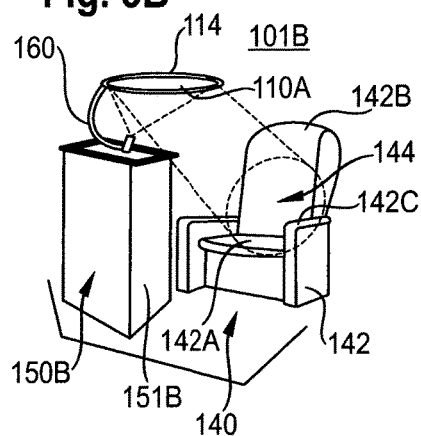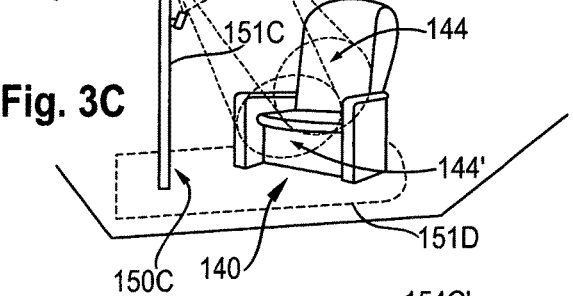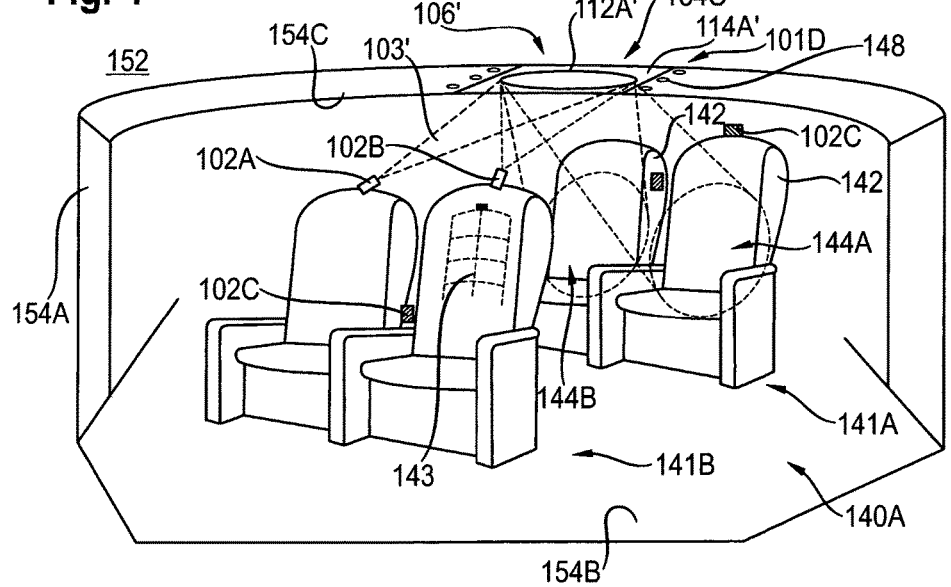

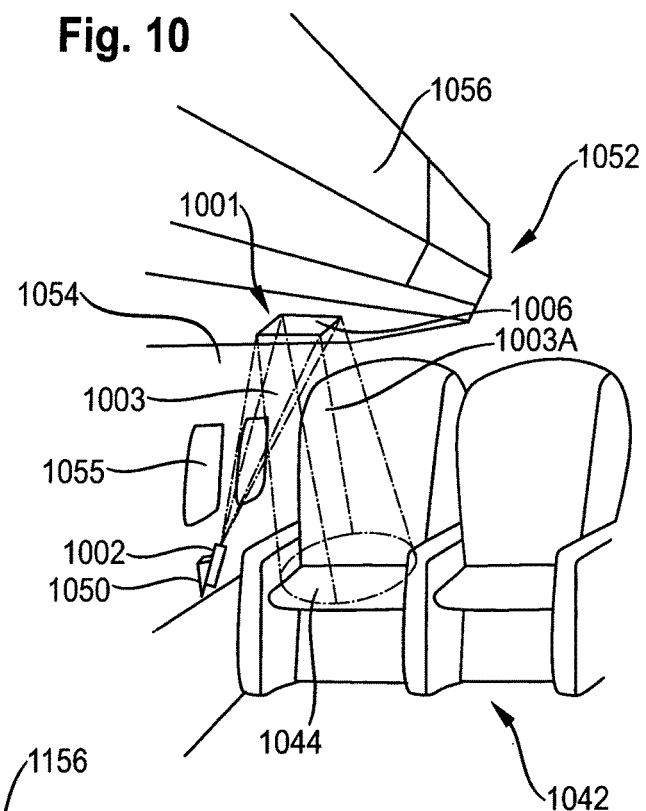
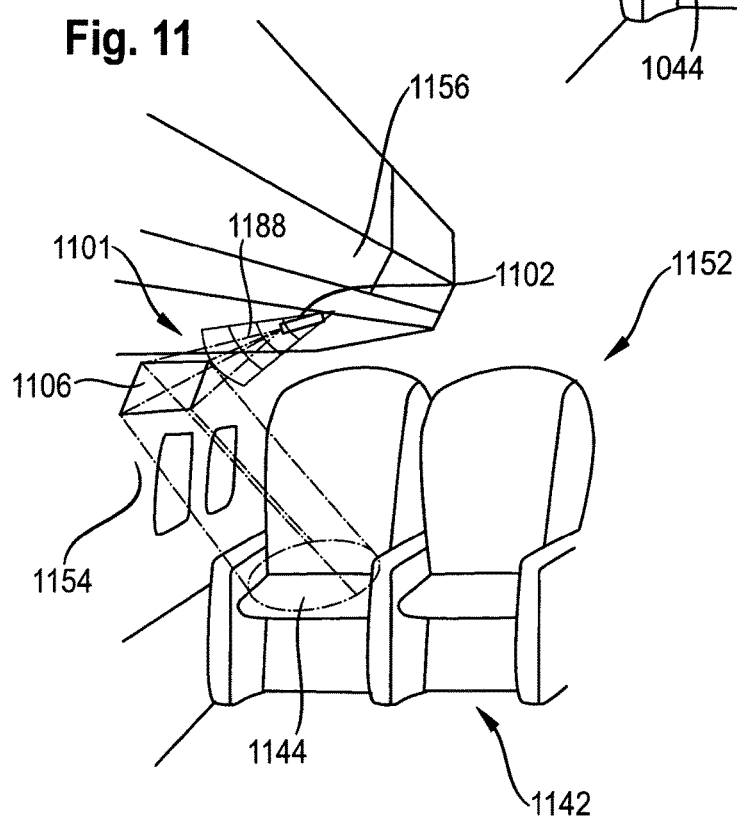

SEAT ILLUMINATING SYSTEM

TECHNICAL FIELD

The present disclosure relates generally to illumination systems, in particular to seat illuminating systems for optically imitating natural sunlight illumination and in particular to combinations of seat illuminating systems with a widened perception/impression of the ambient space.

BACKGROUND

Illumination systems are often provided for seat arrangements such as seats in a car, train, or airplane to, for example, provide a seat specific reading illumination.

In a cabin of a vehicle such as a train, an aircraft, or a cars as well as in a closed, confined, indoor ambience, one may experience discomfort caused by the reduce ability to move, and the perception of the confined environment. This applies, for example, also to situations, where one has to remain or to wait for a significant amount of time in a sitting position on a chair, armchair, a seat, or a recliner such as in waiting rooms, workstations and the like. Often, only a limited view or no view at all may increase stress, fatigue, and even anxiety. For aircrafts, U.S. Pat. No. 7,494,255 B2 discloses ceiling illuminations to improve the comfort of passengers. Moreover, US 2014/0313751 A1 and U.S. Pat. No. 8,267,557 B2 disclose lighting systems for use inside an aircraft cabin.

Several applications such as EP 2 304 478 A1, EP 2 304 480 A1, and WO 2014/076656 A1, filed by the same applicants, disclose lighting systems that use a light source producing visible light, and a panel containing nanoparticles used in transmission, i.e. the light source and the illuminated area are positioned on opposing sides of the panel. During operation of those lighting systems, the panel receives the light from the light source and acts in transmission as a so-called Rayleigh diffuser, namely it diffuses light rays similarly to the earth atmosphere in clear-sky conditions. Specifically, the concept uses directional light with lower correlated color temperature (CCT), which corresponds to sunlight and generates shadows in presence of lit objects, and diffuse light with larger CCT, which corresponds to the light of the blue sky and, in principal, can generate shadows with a blue tinge.

The present disclosure is directed, at least in part, to improving or overcoming one or more aspects of prior systems.

SUMMARY OF THE DISCLOSURE

In a first aspect, the present disclosure is directed to a seat illuminating system for illuminating a target region. The seat illuminating system comprises a seat arrangement having a seat surface and a target region defined for a person sitting on the seat surface. The seat illuminating system comprises further a mounting structure being spatially fixed with respect to the seat arrangement and a reflector unit mounted at the mounting structure and comprising a reflective surface and a luminous layer for homogenously emitting diffuse light at a first color, the luminous layer extending in front of the reflective surface and comprising a visible front area section of the reflector unit, which extends up to a first boundary and through which the diffuse light is emitted. The seat illuminating system comprises further a light projector mounted at the mounting structure and configured to generate a light beam adapted in size for comprehensively illuminating the visible front area section such that at least a portion of the light beam passes through the luminous layer before and after being reflected by the reflective surface, thereby forming an illuminating light beam at a second color directed onto the target region.

In another aspect, a passenger cabin of a transportation unit such as a car, bus, train, or airplane comprises such a seat illuminating system. The cabin may comprise a floor structure, a sidewall structure, and a ceiling structure.

In another aspect, a transportation unit such as a car, bus, train, or airplane comprises such a passenger cabin with a seat illuminating system.

Further embodiments of the above aspects, are disclosed in the claims, which are incorporated herein by reference. For example, in some embodiments, the reflector unit can be, for example, a mirror structure as disclosed in the above mentioned PCT application PCT/EP2014/059802, filed on 13 May 2014 by the same applicants and entitled "Chromatic Mirror, Chromatic Panel and Applications thereof,", which is incorporated herein by reference. In particular, PCT application PCT/EP2014/059802 discloses a mirror with a mirroring surface and a diffusing layer in front of the mirroring surface that is used, for example, to illuminate an object of an exhibition in a sun-like manner. The diffusing layer preferentially scatters short-wavelength components of impinging light with respect to long-wavelength components of the impinging light. For example, the scattering occurs in the Rayleigh or Rayleigh-like regime.

In some embodiments, the mounting structure extends next to the seat arrangement and/or is being spatially fixed with respect to the seat arrangement by being mechanically linked via a wall or a rigid structure, i.e. forms a rigid arrangement.

In some embodiments, a secondary luminous layer associated light source is used, for example, for an additional illumination of the luminous layer from the side. Exemplary embodiments are disclosed, for example, in WO 2009/156347 A1. In those embodiments, the luminous layer may be configured to interact primarily with the light of that secondary light source or with the light from both light sources to provide for the diffuse light.

In some embodiments, a CCT of the diffuse light component from the luminous layer (e.g. in those propagation directions not associated with the illuminating light beam) is 1.2 times larger than the CCT of the light of the illuminating light beam.

In some embodiments, the light beam coming from the light source passes twice through the luminous layer. In some embodiments, the reflective surface is planar or curved such as a parabola. In some embodiments, the reflective surface is encompassed by a framing element, which, for example, is at least partly in relief-shape with respect to the reflective surface or is at least partly recessed with respect to the reflective surface (e.g. comprises a recessed notch or groove).

In some embodiments, the luminous layer comprises a Rayleigh diffuser.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 3A to FIG. 3C are schematic illustrations of exemplary seat illuminating systems;

FIG. 4 is a schematic illustration of an exemplarily cabin with a seat illuminating system;

FIG. 10 is a schematic view of a seat illuminating system in a cabin such as a cabin of a train or airplane;

FIG. 11 is a schematic view illustrating of a further seat illuminating system in a cabin such as a cabin of a train or airplane;

DETAILED DESCRIPTION

Figure 1:
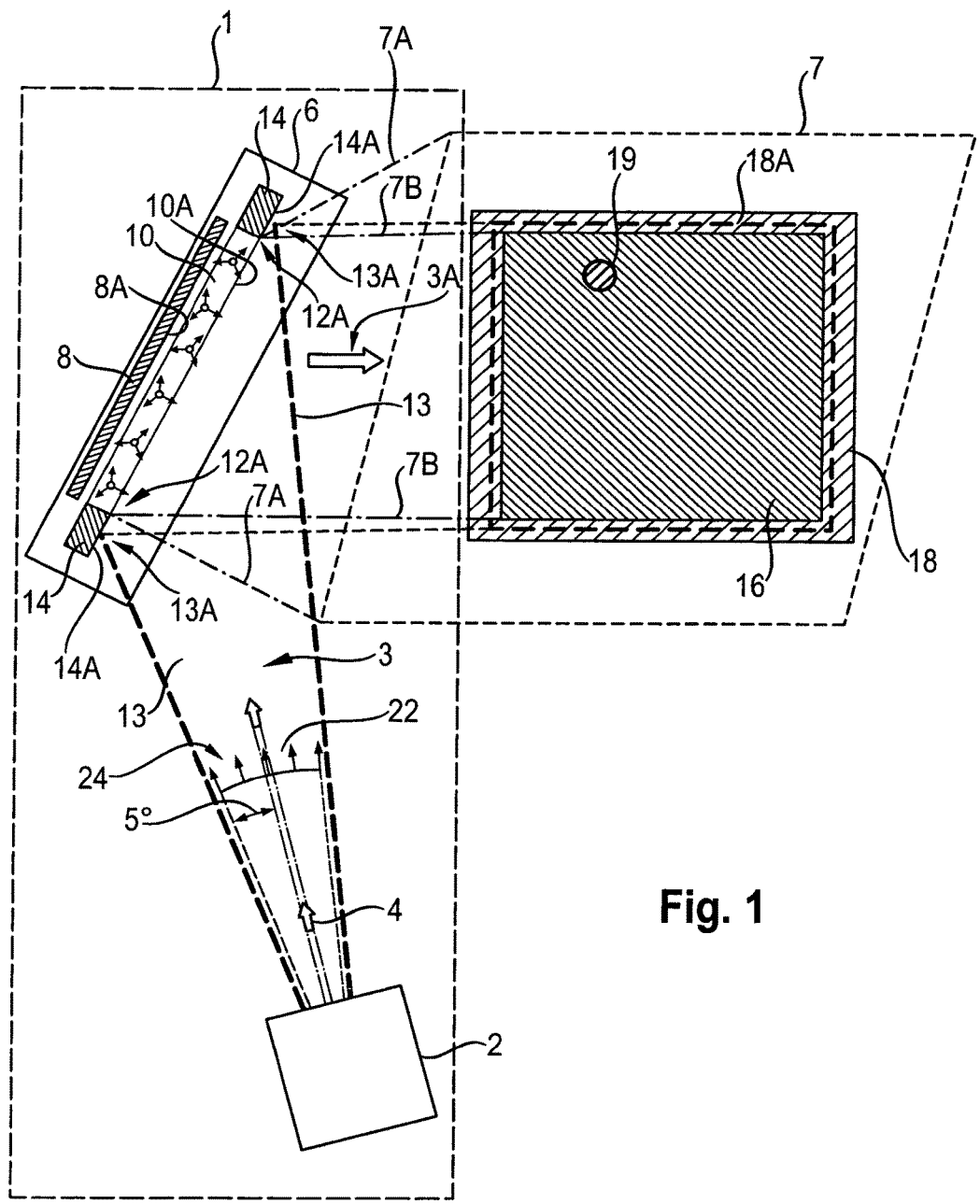
FIG. 1 is a schematic illustration of an exemplarily illumination system specifically illustrating the concept of a frame element.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that one may addresses the problem of discomfort when sitting in confined ambiences by a lighting approach that provides an enhancement of depth perception and an increase of the visual comfort by an optical widening of confined ambience.

In particular, it was realized that linking and coupling an illumination system, which is based on a light projector and a reflector unit, to a seat may allow a user such as a passenger to benefit from the effect of a window-like aperture that opens into "infinite space." The relative position between the illumination system (projector and reflector unit) and the seat may be specifically set to maximize the enhancement of comfort in confined ambiences.

The disclosure is further based in part on the realization that reflective configurations of sunlight imitating illumination systems may allow implementation of those light sources for local illumination such as illumination of a target region of interest associated with a seat or a seat arrangement. The respective systems, herein referred to as seat illuminating systems, introduce the perception advantages in the field of daily life applications such as reading lamps, illumination systems in trains, cars, airplanes etc.

The disclosure is further based in part on the realization that directing a bright, directional light beam of a light projector onto a diffusing panel integrated in a reflector unit (in the sense that the light beam is directed onto a mirror surface behind the panel) can significantly increase the depth perception compared to a plane mirror, without essentially requiring any space in an indoor installation behind the mirror.

In such configurations, the brain is brought to compare and to reference the bright luminous peak consisting in the exit pupil of the light projector to the surroundings such as a frame of the reflector unit, in particular in terms of relative position estimations and depth estimations. In other words, an observer will start comparing the bright peak and the edge of the reflector unit in terms of depth cues: depth of focus, motion parallax, binocular parallax, etc.

Due to those depth cues and their typical ranges of efficacy, the observer may start perceiving the light source encompassed by the surroundings of the reflector unit as being positioned at a large distance, ideally infinite distance, behind the reflector unit, when the projector's pupil is positioned at a respective distance from the mirror. The result is a—at least partial—breakthrough effect giving the observer a sense of widened perception or impression of the ambient space. The result may occur at distances between the projector's pupil and the reflector unit for large rooms/outdoors in the range of 2 m and more, for indoor applications in the range of 1 m and more, and for small environments such as seat arrangements in cars, trains or planes in the range of 0.4 m and more.

It was further realized that typically the high luminance of the light source, e.g. the high luminance of an exit pupil of the light projector, tends to dominate—in terms of visual perception of the observer—over the lower luminance of the rest of the scene reflected by the mirror. The former, however, may offer a reference to the observer that generally may emerge from the background, and the human visual system may continue to perceive the surrounding scene. Thereby, the breakthrough effect driven by the light source may be reduced (or may even collapse from infinite to finite) due to intermediate references that are introduced by different objects and planes of depth of the scene. Those objects and planes of depth may cancel the effect of a source at infinite distance and enforce a depth perception based on the real, finite case.

Thus, it was further realized that the effect of perception of infinite space/infinite distances beyond the reflector unit may remain in effect, if the objects in the ambience are excluded from perception within the reflector unit/mirror. Specifically, it was realized that such an exclusion may be ensured if one overlays a in particular uniform, luminous, for example diffusive, layer to the mirror surface. In this context, the luminous layer acts as a contrast suppressing unit that suppresses optical perception of the vision of the background. A luminous layer can be provided in various ways as disclosed below such as a scattering layer, diffusing part of a light beam projected by a light source, a luminescent layer, a side-lit panel, etc. In general, the luminous layer may be the basis of diffusive light which is emitted in a wide scattering angle. Moreover, a uniformity of the perception of the luminous layer may further increase the separation of a reflected light beam from its "surrounding" on the reflector unit.

Although the luminous diffusive layer may not offer any specific depth cue plainly by being uniform (e.g. not having any visible, macroscopic structure able to catch the vision, or able to drive the focusing mechanisms and/or to be resolvable by the eye), an additional haze provided to overlap any mirroring feature may act as a contrast suppressor of those optical signals caused by in particular highly luminous background structures.

In other words, providing a luminous layer may overcome the technical problem of the breakthrough reduction above described, e.g. by drowning the luminance of the scene (walls, furniture, etc.) well beneath the level of the luminance of the luminous diffusive layer. Here, it may be provided that the luminance of the layer is significantly higher than the luminance of the scene but much lower than the luminance of the light source.

It was further realized that an observer may be brought to perceive essentially three main elements inside the field of view defined by the reflector unit: the bright peak, the uniform luminance background, and the direct surrounding of the luminous layer herein referred to as the frame-like area.

Further is was realized that in the reflective configuration—in contrast to the transmissive configurations mentioned above—the light beam may extend laterally beyond of the luminous layer and in particular beyond a visible front area portion of the luminous layer. Thus, the light beam may affect the visual perception of the frame-like area, which again may affect the impression of light beam/projection based illumination. Thus, it was realized that special care to reduce or even to avoid any visual impression of such a light beam based illumination of the frame-like area may increase the effect of widened perception.

As one type of configurations, it was realized that one may introduce a frame element positioned in the frame-like area to form a frame area section of the reflector unit that extends outside of the visible front area section and at least partly along the first boundary. The frame element may be configured to essentially avoid contribution of the light portion of the light beam incident onto the frame area section to the illuminating light beam such that in particular light of the light beam incident onto the frame area section is essentially removed from the illumination system by, for example, absorption, reflection, and/or light guidance.

As another type of configurations, it was realized that one may at least partly adapt the size of the light beam to not extend at least into some section of the frame-like area. For example, it was realized that by forming a second boundary of the light beam, which at least partly follows a first boundary, e.g. does completely illuminate the visible front area section of the luminous layer but does not illuminate beyond the same, a reduction of the light beam based illumination of the frame-like area may be achieved. For such a limitation and adaptation of the light beam (in particular its shape and size), the light projector may comprise, for example, an optical system. Moreover, a control configuration may be provided to maintain the matching of the light beam's outer boundary and the luminous layer's outer boundary.

As another type of configurations, it was realized that one may configure the illumination system such that light of the light beam may freely pass by the visible front area section. Specifically, at least a large portion, with respect to the perception of an observer, will, for example, not fall onto a structure that would link the observer of the reflector unit to a light beam illumination. For example, it was realized that the reflector unit may be mounted at the top end of a post of a stand lamp such that the light beam only illuminates the visible front section, or that illuminates under a large incident angle to spatially separate any light beam encountered structure from the reflector unit.

It was further realized that the various types of configurations may be applied in combination, e.g. providing a frame element in some section and a perfect adaptation of the beam shape in another section of the frame-like area.

Moreover, it was realized that providing the light emitted by the luminous layer with a color (for example, bluish, sky-like, e.g. in the range from 7000 K and more), the obtained blue background within, for example, a frame element structure may further enhance the depth perception. In particular, the blue color may be associated to aerial perspective. This may further shift the perceived distance of the intermediate-luminance layer to infinity similarly, to what happens in the vision of landscape elements at great distances from the observer.

It is noted that the overall effect may resemble an open window through which the sky and the sun are seen. In other words, the perception induced in the observer is that produced by a window, opened to a bright sun at infinite distance surrounded by blue sky.

Moreover, referring to those lighting systems discussed above using a panel in transmission, the present disclosure is based in part on the realization that creating an infinite depth perception using those "transmissive" lighting systems may require a significant volume beyond/behind the panel where the light projector is positioned (for example, at a displacement of several meters from the panel). Even when using folding mirrors, thereby folding the required optical path length and reducing the depth of the system, the final size of the transmissive configuration can result in a significant loss of space in indoor installations. In contrast, using reflective configurations as disclosed herein may allow an efficient use of indoor space.

Moreover, it was realized that—even when not a perfect perception of a sunlight-like illumination may be achieved in seat illuminating systems due to, for example, the limited space available—the specific light perception of CCTs and light distribution in space and light propagation directions (diffuse and directed light), contrast between lit up regions and shadow zones as well as other features that are typical for natural illumination may positively affect the experience of the illumination.

In the following, exemplary configurations of seat illuminating systems (FIG. 3A to 3C) and their installations in cabins (see e.g. FIGS. 4, 10, and 11) and cars (see e.g. FIGS. 7A to 9D) are described. Moreover, illumination systems that may form the basis for seat illuminating systems are described further for illustration of the underlying reflective concept. For example, an exemplary frame-type configuration is described in connection with FIGS. 1, 12A, 12B, and 13, a frame-like configuration is described in connection with FIG. 5, and an "ideal fit" configuration is described in connection with FIG. 6.

General concepts of optical design are disclosed in connection with FIGS. 2A to 2D. For an exemplary side-lit configuration of a reflector unit it is referred to the respective patent applications in the field of transmissive concepts of sunlight imitating illumination mentioned above, which may equally be applied in reflective configurations as disclosed herein. Aspects of light distribution, coloring, and color measuring are described in connection with FIGS. 15 and 16.

Herein, an illumination system is considered to comprise essentially a light source and a reflector unit of the specific type that inter alia allows sunlight-like illumination. Those components are—as parts of a seat illuminating system—specifically adapted, oriented, and mounted with respect to a seat arrangement such that a respective target region of the seat arrangement is illuminated. Various features of the underlying illumination systems will be exemplarily described in the following and then brought into context of selected exemplary implementations in seat arrangements.

Referring to FIG. 1, aspects of an optical setup as well as the perceptive aspects of illuminations systems (as generally disclosed herein) are described for an exemplary frame-based illumination system 1 as it could be used in seat illuminating systems disclosed herein.

Illumination system 1 comprises a light source 2, configured to emit light in an emission solid angle to form a light beam 3 (in FIG. 1 delimited by dashed lines 13) propagating along a main light beam direction 4 (also referred to as main beam axis). Generally, light source 2 can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

Regarding light sources applicable to the technology disclosed herein, it is further referred to PCT/EP2014/001293, entitled "Light source and sunlight imitating lighting system," filed on 14 May 2014 by the same applicants, the contents of which are herein incorporated in their entirety. In particular PCT/EP2014/001293 illustrates light source configurations providing high quality light beams.

To reduce the dimension of illumination system 1, the optical systems downstream of the respective light emitter may include an optical system such as folding optics (not shown in the embodiment of FIG. 1) or aperture based imaging (see, for example, the description below in connection with FIGS. 14A and 14B). For the optical imaging system, there may be geometric conditions on, for example reflected, light rays of the light beam to be specifically matched in dimension with downstream optical components.

Illumination system 1 further includes a reflector unit 6 that couples the light originating from light source 2 to a region to be lit up, for example an area in which a sitting person would require light, e.g. on its lap when reading a book. In general, reflector unit 6 comprises a reflective structure 8 providing a reflective surface 8A and a luminous layer 10.

Reflective surface 8A is generally any type of optical acting interface that reflects light having passed through luminous layer 10. For example, reflective surface 8A may be a surface of an aluminum layer or an interface between components, such as a reflective coating. Due to reflective surface 8A, light of light beam 3 being incident on reflective surface 8A is redirected to pass again through luminous layer 10, thereafter forming an illuminating light beam 3A (in FIG. 1 delimited by dash-dash-dotted lines 7A). In FIG. 1, a range 7 of visible sun locations is illustrated, where it is referred in the wording "visible sun locations" exemplarily to the "sun" because an especially impressive type of embodiments of illumination system 1 relates to sun-like illumination. Illuminating light beam 3A is, thus, directed in the to be illuminated region that may be in front of and/or at least partly cover the seat surface associated with the seat arrangement. Illuminating light beam 3A comprises directed light (later also referred to as directed (light) component of the illumination system).

Luminous layer 10 is generally configured for emitting diffuse light (later also referred to as diffuse (light) component of the illumination system) at a first color, e.g. in case of a sky imitation a bluish sky color. Luminous layer 10 is superimposed to reflective surface 8A, extends in front of reflective surface 8A, and comprises a visible front area section 10A of reflector unit 6 that an observer can see when looking at reflector unit 6. Visible front area section 10A extends up to a first boundary 12A (forming a closed line). Through/from visible front area section 10A, the diffuse light component is emitted.

In the exemplary embodiment of FIG. 1, a frame-like area extends next to and surrounding visible front area section 10A.

Light source 2 provides light beam 3 that is adapted in size for comprehensively illuminating visible front area section 10A. In particular for a consistent perception in a sun imitating configuration, the comprehensive illumination will ensure that the sun is seen until it vanishes behind first boundary 12A when an observer moves across the to be illuminated region (see also the description of FIGS. 2A to 2D). Moreover, in case of the passive generation of light by luminous layer 10 as discussed below, the comprehensive illumination of visible front area section 10A results in the complete visible front area section 10A contributing to and generating the diffuse light component at the first color.

Comprehensively illuminating visible front area section 10A ensures further that at least a portion of light beam 3 passes through luminous layer 10 before and after being reflected by reflective surface 8A. As reflective surface 8A extends similarly up to first boundary 12A, it is ensured that illuminating light beam 3A corresponds in size to first boundary 12A. Illuminating light beam 3A has a second color that is associated with, e.g., an illuminating light beam CCT. The first color associated with light emitted from luminous layer 10 and the second color associated with illuminating light beam 3A are separated in color space.

For example, the first color and the second color may be separated in the CIE 1976 (u',v') color space by, at least 0.008 such as at least 0.01, 0.025, or 0.04, where the color difference $\Delta u'v'$ is defined as the Euclidean distance in the u'v' color space. In particular for sun-imitation configurations, the illuminating light beam CCT of the second color may be close to the Planckian locus (e.g. in the range from 800 K to 6500 K). In some embodiments the second color may correspond to u'v' points with a maximum distance from the Planckian locus of e.g. 0.06. In other words, a distance from the Planckian locus is, for example in the range from 800 K to 6500 K, given by $\Delta u'v' \leq 0.060$. In this context, it is also referred to FIG. 15 and the related disclosure.

As it is apparent to the skilled person, depending on any interaction of luminous layer 10 with light beam 3, the color and/or CCT of light beam 3 and illuminating light beam 3A may be essentially identical or may differ. Depending from the type of nanoparticles and their concentration, the CCT difference may be, for example, at least 300 K or even 1000 K or more.

In the embodiment of FIG. 1, reflector unit 6 further comprises a frame element 14 positioned in the frame-like area to form a frame area section 14A of reflector unit 6 that extends outside of and next to visible front area section 10A. Frame area section 14A borders to and extends at least partly, for example at one or two sides, along first boundary 12A.

In general, frame element 14 is configured to essentially avoid or at least reduce any contribution of the light portion of light beam 3 incident onto frame area section 14A to the illuminating light beam 3A. In consequence, any light incident on frame area section 14A may no longer be perceived as illuminating the frame area section 14A of illumination system 1. For example, any light of light beam 3 incident onto frame area section 14A is essentially removed from illumination system 1 by, for example, absorption, reflection, and/or light guidance. Alternatively or additionally, configurations of the frame's surface structure in relief, e.g. being embossed, may provide for a discontinuity with respect to the perception of the visible front area and, thereby, may form a basic condition that makes the light form frame area section 14A perceivable as being independent from light beam 3.

In addition or alternatively, the perception of frame area section 14A may be disconnected from light beam 3 by providing an absorptance (i.e. the ratio of the absorbed radiant or luminous flux to the incident flux, in line with designation: E284-09a of Standard Terminology of Appearance), e.g. an absorptance in the range of or more than 60%. However, in dependence of the general—the perception affecting—conditions such as the depth of the surface modulation and the size of the illumination system in general, also essentially bright colorings of the frame area section 14A may be acceptable such as the frame being white or grey.

Looking from within range 7 of visible sun locations onto reflector unit 6, an observer may have an optical perception as schematically indicated in FIG. 1 within range 7. The optical perception essentially depends on reflector unit 6 and the light coming therefrom as illustrated by dash-dotted lines 7B being specific for the respective observer position. Specifically, illumination system 1 is configured such that light of significant intensity incident within range 7 of visible sun locations originates from within first boundary 12A. The light of significant intensity comprises light of illuminating light beam 3A (originating from light source 2 and being light of light beam 3 redirected by reflector unit 6), and diffuse light originating from visible front area section 10A of reflector unit 6, specifically originating from luminous layer 10. In addition, the optical perception will—for the embodiment of FIG. 1—comprise a, for example dark colored, frame-like area around visible front area section 10A.

In line with the optical perception illustrated above, the observer, when looking from within range 7 of visible sun locations onto reflector unit 6, will see a large area 16 corresponding to visible front area section 10A based on the homogenously emitted diffuse light at the first color. Large area 16 will be surrounded by a frame-like area 18 that is perceived homogenously or at least as essentially not being illuminated by a light beam because light incident on frame area section 14A is removed from illumination system 1, and, thus, does no longer take actively part in the perception of reflector unit 6. In addition, the observer will see a sun-like spot 19 at the second color caused by the reflected light of light source 2, specifically of illuminating light beam 3A.

Reflector unit 6 may be of any shape such as a (planar) rectangular, quadratic, or circular shape. Reflector unit 6 is at least partly reflecting the light of light source 2. Luminous layer 10 of reflector unit 6 may operate as a diffuse light generator such as a Rayleigh diffuser, which substantially does not absorb light in the visible range and which diffuses more efficiently the short-wavelength in respect to the long-wavelength components of the impinging light. Optical properties and microscopic characteristic of Rayleigh like diffusers are described in detail for the above mentioned transmissive type patent applications such as in EP 2 304 478 A1.

In some embodiments, reflector unit 6 provides luminous layer 10 to diffuse the light of light source 2, herein referred to as passive diffuse light generation. For passive diffuse light generation, and under the assumption that light beam 3 diverges enough to illuminate completely visible front area section 10A, reflector unit 6 separates light beam 3 in two components, originating from the complete visible front area section 10A, particularly in:

a reflected (directed non-diffuse) component, formed by light rays that pass twice through luminous layer 10 and do not experience significant deviations besides the reflection by reflective surface 8A; e.g. is formed by light rays experiencing a deviation smaller than, e.g., 0.1° with respect to each other; a luminous flux of the transmitted component is a significant fraction of the overall luminous flux incident on luminous layer 10; in some embodiments, luminous layer 10 may be configured to overlay a low angle white scattering feature onto the incoming light beam, thereby the illuminating light beam may comprise a spread of directions within a small cone (e.g. below 5°) but such a modified illuminating light beam is still, for the purpose of this disclosure, considered to be a directed light beam (it is noted that such a low angle scattering may allow averaging out an inhomogeneity over the light source aperture; and a diffuse component, formed by scattered light exiting luminous layer 10 through visible front area section 10A (with the exception of that illuminating light beam direction and of directions differing from that illuminating light beam direction by an angle smaller than 0.1°); the diffuse component includes scattered light directly exiting luminous layer 10 and scattered light being reflected by reflective surface 8A; a luminous flux of the diffuse component may correspond to a blue skylight fraction generated from the overall luminous flux incident on luminous layer 10.

For the passive scattered light generation, the optical properties of luminous layer 10 may be such that the fraction of the diffuse component is within the range from 5% to 50% such as within the range from 7% to 40%, or even in the range from 10% to 30%, or within the range from 15% to 20% with respect to the total light falling onto visible front area section 10A (in this respect, the low angle scattering is not considered to contribute to the diffuse component);

the average CCT of the diffuse component is significantly higher than the average correlated color temperature CCT of the reflected component e.g. at angles smaller 0.1°, for example it may be higher by a factor of 1.2, or 1.3, or 1.5 or more;

luminous layer 10 does not absorb significantly incident light, namely the sum of the two components is at least equal to 80%, or 90%, or even 95%, or 97% or more;

luminous layer 10 may scatter mostly forward, namely more than 1.1, or 1.3, or even 1.5, or 2 two times more than is back scattered; forward scattered light during the first passage being reflected by reflective surface 8A; and luminous layer 10 itself may have low reflection, namely less than a portion of 9%, or 6%, or even less than 3%, or 2% of the impinging light of light beam 3 is reflected.

In other embodiments, luminous layer 10 may at least partly be illuminated by a separate light source adapted to provide light as the basis for the diffuse component herein referred to as a side-lit configuration.

In general, light source 2 may illuminate the front surface of luminous layer 10 in its entirety under an angle of incidence of beam axis to the normal of the reflector within the range from, for example, about 15° to about 70° such as, for example, 50° for an angled incidence, or about 20° for a steep incidence. In some embodiments, light source 2 may be arranged essentially vertically below, for example, the center of luminous layer 10, when, for example, luminous layer 10 is tilted with respect to the plane of a room ceiling. The angle of aperture (full aperture) of the light beam may be in the range from about 10° to about 60°.

In general, reflector unit 6 is positioned in the far field of light source 2 such that it interacts with a light beam as schematically illustrated in FIG. 1 and described below in more detail. High quality light beams—having, for example, projector angular pupil size in the range of 5° and smaller—may allow light source 2 to provide a sun-like impression.

FIG. 1 illustrates exemplarily light beam 3 as a divergent light beam in the far field. The far field depends on the near field as generated by light source 2 and is characterized by main light beam direction 4. The local propagation direction across divergent light beam 3, i.e. a propagation direction of the directed non-diffuse light, is modified/changes in dependence of the position within the cross-section of divergent light beam 3 as wells as of illuminating light beam 3A. Exemplarily illustrated for light beam 3 but similarly applicable to illuminating light beam 3A, a central propagation direction 22 is essentially parallel to main light beam direction 4 in an inner area of light beam 3. However, a propagation direction 24 is increasingly inclined with respect to main light beam direction 4 with increasing distance from the inner area. Exemplarily, a maximum angle of 5° is indicated in FIG. 1 for the light beam portion being the furthest out, which corresponds to a beam divergence (also referred to as total angular spread in the far field) of 2×5°=10° of divergent light beam 3 as wells as of illuminating light beam 3A.

In general, light source 2 may include an emitter unit, a collimation unit, and a homogenization unit, which are those optical units that define an optical near field and emit light through a light source exit aperture that is, for example, fully flashed and represents a light emitting surface with a homogeneous luminance and an etendue that maintained as much of the original etendue of the emitter unit.

Light source 2 may further include an electronic control unit (not shown) for providing the electronic background to operating the primary light generation process that takes place in emitter unit. Similarly, light source 2 may include structural components such as a housing to provide support for the optical units and to position them in a fixed manner with respect to each other. Moreover, the generated light is adaptable to the specific aspects of respective illumination conditions. In particular it may be adapted to the interaction with reflector unit 6, e.g. to provide a desired color of the diffuse and directed components. The adaptation relates inter alia to the emission direction distribution, the color spectrum, and the intensity distribution.

For example, light source 2 provides light in the visible region of the light spectrum with wavelengths between 400 nm and 700 nm with a spectral width larger than 100 nm, e.g. larger than 170 nm.

In dependence of respective embodiments, the distance between light source 2 and reflector unit 6 may be in the range from 1.5 m to 7 m for a light source having an exit aperture of, for example, 0.15 m. For such a situation, an optical distance between the light source and the observer is, for example, in the range from at least 2.5 m to 9 m or more. Similarly, for example for indoor installation such as seat illuminating applications, the distance between light source 2 and reflector unit 6 may be in the range from 0.5 m to 1 m for a light source having an exit aperture of, for example, 0.05 m. For such a situation, an optical distance between the light source and the observer may be, for example, in the range from at least 0.5 m to 1 m or more.

For the herein disclosed lighting systems, the required total angular spread in the far field depends on the distance to and the size of the to be illuminated reflector unit 6. Orthogonal total angular spreads of 10° and 30°, respectively, for a rectangular object (reflector unit 6) with size 1 m×2 m being illuminated under 45° provide an acceptable distance between light source 2 and reflector unit 6. For example for indoor applications such as seat illuminating applications, reflector sizes may be in the range of 0.2 m×0.2 m (e.g. for steep incidence) or 0.2 m×0.4 m (e.g. for angled incidence). As will be apparent to the skilled person, total angular spreads in the range from 5° to 60° or in the range from 5° to 50° would be applicable for some of those lighting systems discussed herein and respective shapes of reflector units 6.

As indicated above, light source 2 may be designed to have or may be adaptable to provide specific shapes of light beam 3 that are specifically adapted to completely illuminate visible front area section 10A. Respective light sources may include an optical system to limit and to adapt a size of light beam 3. For example, light sources may include a zoom lens system and/or a beam shape defining imaging system such as a fly's eye configuration, an essentially ideal CPC configuration, a transmissive aperture and/or reflective aperture based imaging system upstream of the reflector unit, thereby in particular at least partly adapting the size of the light beam and forming a second boundary which at least partly follows first boundary 12A.

Referring again to the optical perception as illustrated in FIG. 1, first boundary 12A delimits visible front area section 10A. A second boundary 13A corresponding to dashed lines 13 is formed on reflector unit 6. Second boundary 13A corresponds to the lateral extent of light beam 3 as it is given, for example, for a flat top beam having a steep decrease in luminance in radial direction in the region of second boundary 13A.

Light beam 3 is at least as large so as to completely illuminate visible front area section 10A. In the embodiment of FIG. 1, second boundary 13A will accordingly result on frame area section 14A in an inner region being illuminated by light beam 3 and an outer region not being illuminated by light beam 3. On dark frame-like area 18, a dashed line 18A illustrates a corresponding transition line between those regions. However, as frame area section 14A is configured to not be affected in its visual appearance due to impinging light, dark frame-like area 18 is essentially seen as being not illuminated at its inner region by light beam 3.

As only the beam portion falling within first boundary 12A is reflected, illuminating light beam 3A will in its lateral extent be defined by the size of visible front area section 10A as indicated in FIG. 1 by dash-dash-dotted line 7A illustrating a third boundary and defining range 7 of visible sun locations. It is noted that, when being outside of range 7 of visible sun locations, an observer will—when looking at reflector unit 6—notice an essentially homogenously emitting diffuse light area. The diffuse light may be in the color spectrum of the sky, and, in the embodiment of FIG. 1, surrounded by frame elements 14 but without sun-like spot 19 as the reflective arrangement does not allow the observer to see the exit pupil of light source 2. In addition, an observer—being within or outside of range 7 of visible sun locations—sees collimated light of light beam 3A illuminating any surface positioned within range 7 of visible sun locations. Thereby, the perception of the sun-light imitation may be enforced.

It is noted further that FIG. 1 illustrates the components of reflector unit 6 individually and separated from each other for illustration purposes. However, the skilled person will understand that the various components are as "close" with respect to each other as their functions require. For example, reflective structure 8 and thus reflective surface 8A may be in contact with the back side of luminous layer 10. Frame element 14 may be as close as necessary to luminous layer 10 to ensure an observer being in range 7 of visible sun locations not to resolve any optical inconsistencies.

Moreover, as shown in FIG. 1, frame area section 14A and visible front area section 10A of the front face of reflector unit may be positioned in a plane (e.g. curved or planar plane), thereby providing the impression of a flat/continuous front face.

In general, frame element 14 may be positioned to create a light beam shadow zone (i.e. a region downstream of frame element not subject to illumination by light beam 3) that essentially does not overlap with the visible front area section 10A. This in particular may ensure complete illumination of the same as discussed below in combination with FIGS. 2A to 2D. Again, the extent of the shadow zone is limited to ensure an observer being in range 7 of visible sun locations not to resolve any optical inconsistencies, in this case, for example, an unevenness of the diffuse component emitted through visible front area section 10A.

The skilled person will recognize those aspects and features disclosed in connection with FIG. 1 that equally will be applicable to the embodiments disclosed below for other embodiments in connection with the remaining figures. This applies, for example, to the luminous layer and the light source as well as the discussion of the light propagation.

Returning to frame element 14 shown in FIG. 1 a surface configuration and/or a structural configuration of the frame element(s) may be, in general, configured to absorb at least 60% of a light portion of light beam 3 incident onto the respective frame area section. Specifically, an absorptance of at least 60% may be given in the visible spectrum (e.g. in the range between 400 nm and 700 nm), or at least in the portion of the visible spectrum in which a power spectral density of the projector is larger than 10% its peak value. For that purpose, frame element 14 may be provided with a light absorbing color.

With respect to alternative or additional structural configurations, the frame element may comprise coarse grain structures, large structures, decorations, and/or patchy finishing, for example, on the scale of the frame width such as 0.02 to 0.2 of the frame width. For example, a frame element with a coarse grain structure may comprise large (e.g. macroscopical, visible) structures such as a chessboard, foliage, random decorations, or fractal patterns that are painted or printed (2D) or molded/finished in relief (3D) with average grain/cell size on the scale 0.02-0.4 times the width of the frame. In addition or alternatively, the frame element may be provided with an absorptance modulation such that at least 5% of the surface area of the frame element differs in absorptance from the average value (on the frame element) by more than 10%. In general, the structured surface may result in an unevenness in optical appearance that even when partly illuminated may not allow or at least largely hinder any associating of the appearance of the frame to illumination by light beam 3. However, the elevation of the structure should again not affect the complete illumination of the visible front area section.

Figure 2A:
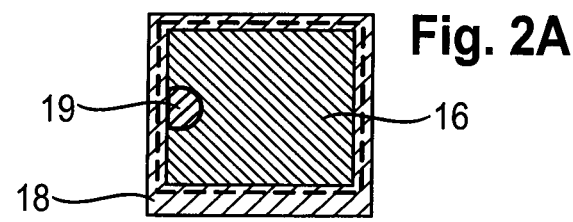
FIG. 2A and FIG. 2B are schematic illustrations of the perception of reflector units by an observer for complete illumination of the visible front area section of a luminous layer.
Figure 2B:
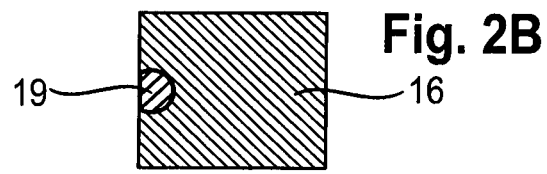

FIGS. 2A and 2B illustrate the influence of a comprehensive illumination, which is in particular important at that transition in and out of range 7. At that transition, the aperture of light source 2 will enter the field of view. For complete illumination (shown in FIG. 2A for a frame configuration and in FIG. 2B for an ideal fit configuration described in more detail below), the "sun" will appear (and disappear) exactly at the boarder of large area 16.

Figure 2C:
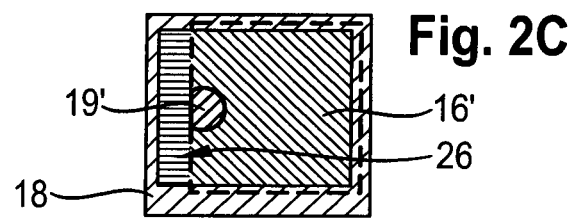
FIG. 2C and FIG. 2D are schematic illustrations of the perception of the reflector units with incomplete illumination of the visible front area section of a luminous layer.

In contrast, referring to FIG. 2C, assuming that frame 14B generates a shadow zone 26 on visible front area section 10A, light beam 3 illuminates only a part 16' of visible front area section 10A. Thus, the perception of visible front area section 10A (assumed to relate to a passive configuration) is split in two portions of different appearances—one being illuminated and one being in the shadow zone 26. Moreover, "sun" 19' will appear at the border between shadow zone 26 and part 16' of visible front area section 10A, i.e. at a distance to the frame, thereby reducing the sun-like impression.

Figure 2D:
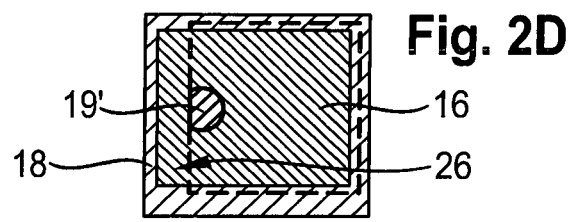

For an active configuration of a luminous layer, as shown in FIG. 2D, large area 16 would in its generation of diffusive light not be affected by shadow zone 26. However, "sun" 19' related to the (first) light source will appear at the boarder between shadow zone 26 as in FIG. 2C, i.e. at a distance to frame-like area 18 and in the middle of large area 16, thereby similarly reducing the sun-like impression.

FIGS. 3A, 3B, and 3C show exemplary embodiments of seat illuminating systems 101A, 101B, and 101C. The seat illuminating systems are generally based on the illumination systems as described herein that include a light source 102 (generating a light beam 103) and a reflector unit 106 onto which the light beam 103 is directed and which reflects light beam 103, thereby forming an illuminating light beam 103A. For keeping the drawings simple, the respective reference numerals are only shown in FIG. 3A.

Seat illuminating systems 101A, 101B, and 101C generally comprise further a seat arrangement 140, each comprising a single seat 142 with, for example, a seat surface 142A, a backrest 142B, and an armrest 142C. As further indicated in the drawings, a target region 144 extends on top of seat surface 142A and at a lower section of backrest 142B. For keeping the drawings simple, the respective reference numerals are only shown in FIG. 3B.

Seat 142 may extend up to a height $H_S$ as exemplarily indicated in FIG. 3A.

FIGS. 3A, 3B, and 3C illustrate exemplary configurations of underlying mounting structures at which light source 102 and reflector unit 106 are mounted and with respect to which seat arrangements 140 are spatially fixed. Spatially fixed indicates in this context a rigid arrangement that essentially provides for a fixed position of target region 144 with respect to respective light source 102 and respective reflector unit 106. A controlled movement of target region 144 due to, for example, an included joint or optical adaptation is also considered to fall within the concept of a spatially fixed mounting of light source 102 and reflector unit 106 to the mounting structure.

For example, FIG. 3A shows a mounting structure 150A that comprises a vertical section 151A integrated into or extending along a wall. Light source 102 and reflector unit 106 are mounted at vertical section 151A at a distance of, for example, 0.4 m to 1 m. Mounting structure 150A further comprises a ground section (not shown), which extends beyond the floor and is rigidly connected to vertical section 151A. In addition, seat 142 is rigidly connected, e.g. mounted to, the ground section as indicated by dotted lines of a, for example bolted, connection.

As further indicated in FIG. 3A, reflector unit 106 is mounted at a height $H_R$ that is higher than the height $H_S$ of seat 142, thereby providing an inclined top-down illumination of target region 144.

FIG. 3B illustrates a mounting structure 150B comprising a block-shaped support 151B such as being implemented in a piece of furniture. On block-shaped support 151B, an illumination system is mounted that comprises a high precision mount 160 connecting both, light source 102 and reflector unit 106, for high position alignment of light beam 103 with respect to a visible front area section 110A of reflector unit 106. High precision mount 160 may be adjusted initially during installation of seat illuminating system 101B, and/or may be adaptable and/or controllable during operation of seat illuminating system 101B. High precision mount 160 may compensate for a misalignment of light beam 103 as discussed below, for example, in connection with an "ideal fit" configuration of illumination systems.

Block-shaped support 151B may again be fixedly connected to a ground section (not shown) of mounting structure 150B.

FIG. 3C illustrates a mounting structure 150C comprising a pole configuration, wherein a pole 151C represents a further example of a vertical section. Pole 151C is mounted to a schematically indicated ground section 151D of seat illuminating system 101C.

As further illustrated in FIG. 3C, reflector unit 106 may be mounted via a joint 146 to pole 151C for providing a movability of reflector unit 106 thereby allowing moving target region 144 to the different positions with respect to seat 142, e.g. to a target region 144'. Similarly, light source 102 may be attached to pole 151C in a manner allowing adjustment of the direction of light beam 103.

As further shown (with the reference numeral exemplarily provided in FIG. 3B), reflector unit 106 comprises a frame element 114 surrounding visible front area section 110A of a luminous layer (not shown in detail).

Frame element 114 may be configured in any of the herein disclosed configurations to essentially avoid contribution of light portions of light beam 103 (incident onto frame element 114) to illuminating light beam 103A. Accordingly, light of light beam 103 incident onto frame element 114 is essentially removed from seat illuminating systems 101A, 101B, and 101C, by, for example, absorption, reflection, and/or light guidance.

As indicated above, for the case of "ideal fit" configurations, the optical features of frame 114 may differ or not be as important for the perception of reflector unit 106 as light beam 3 is limited to visible front area section 110A.

FIG. 4 illustrates an embodiment of a seat illuminating system 101D within a room-like environment such as a cabin 152. Cabin 152 is schematically indicated in FIG. 4 as a cabin of, for example, a transportation unit such as an airplane, a train, or a bus cabin. Cabin 152 comprises sidewalls 154A, a floor 154B, and a ceiling 154C each having an underlying structure to provide the respective stability of the cabin.

In a roof section 154C' of ceiling 154C, a reflector unit 106' is mounted to the ceiling structure and is surrounded by a frame area section 114A'. Frame area section 114A' may be configured as a frame element as disclosed herein for absorbing light extending beyond a first boundary 112A'. Frame area section 114A' may be, for example, a dark colored ceiling providing an absorptance of about 60%. In cases, when a multitude of reflector units is used one close to the other, most of or the complete ceiling 154C may be configured in such a light absorbing manner.

Cabin 152 comprises a seat arrangement 140A with a sequence of rows each having one, two, or more seats 142 side to side. In FIG. 4, exemplarily two rows 141A and 141B each having two seats 142 are schematically illustrated.

In FIG. 4, the underlying illumination system comprises two light sources 102A, 102B that are used in combination with a single reflector unit, i.e. reflector unit 106'. Each of light sources 102A, 102B results in respective illumination regions 144A, 144B. Illumination regions 144A, 144B may be separated in space and clearly distinguish illumination regions for different seats 142.

The skilled person will recognize that the two light source embodiment shown in FIG. 4 may be easily extended to three or more light sources. In particular, in indoor configurations multiple specific regions may be illuminated that are close to each other but separated by some space, while each illumination region is subject to its own controllable light source.

FIG. 4 illustrates mounting light source 102A at a backrest 142B of one seat and light source 102B at a backrest 142B of a neighboring seat. Schematically, a frame structure 143 is illustrated at which light source 102B is exemplarily fixedly attached.

Moreover, FIG. 4 illustrates alternative positions for light sources 102C, for example, in between seats of row 141A or at the same seat for which a respective target region is illuminated.

In alternative embodiments, light sources may be installed at sidewall structures or ceiling structures of the cabin as exemplarily discussed below in connection with FIGS. 10 and 11.

As shown in FIG. 4, volumetric motion sensors 148 may be provided, for example, at the ceiling 154C next to reflector unit 106' to monitor whether someone or something interferes with light beam 103', and to further control operation of light sources 102, in case an interference is detected.

Figure 5:
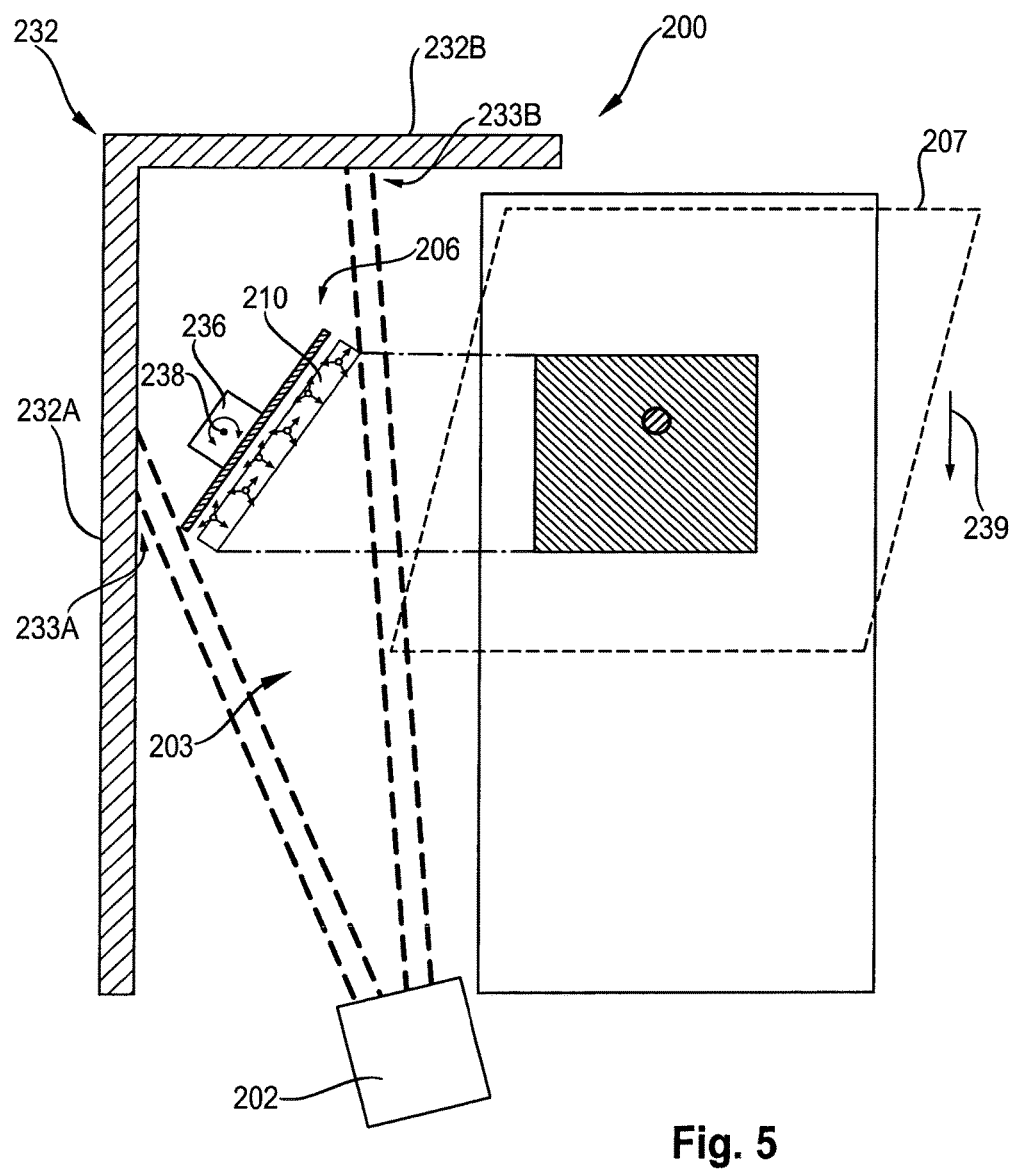
FIG. 5 is a schematic illustration of a further exemplary illumination system specifically illustrating the concept of a corner installation.

FIG. 5 illustrates an embodiment of an exemplarily illumination system 200 not relying on a frame element provided right next to luminous layer 210, but instead on adapting the background provided downstream of a reflector unit 206 illuminated under an angle by a light source 202. Specifically, reflector unit 206 is mounted with some distance to a wall configuration 232 such as an indoor room delimiting wall section or an outdoor wall configuration. Wall configuration 232 may be provided together with reflector unit 206 and may partly act as a portion of illumination system 200.

Wall configuration 232 comprises inter alia a background wall section 232A in front of which reflector unit 206 is positioned and mounted. In addition or alternatively, wall configuration 232 comprises a light subjected wall section 232B. Onto both sections, light beam portions 203A, 203B of light beam 203, which pass by reflector unit 206, is incident.

At least one of background wall section 232A and light subjected wall section 232B may be provided with a light absorbing color and/or may comprise coarse grain structures, large structures, decorations, and/or patchy finishing as described above for the frame element. In light of the absorption and the potentially spatial remoteness between the light impinging area on the wall sections and reflector unit, the visual perception of reflector unit 206 may be essentially unaffected by light beam portions 233A, 233B passing reflector unit 206.

In general, a reflector unit may be adjustable in position and orientation, thereby affecting the location of range 207 of visible sun locations and allowing the adaptation of the target region of a seat arrangement.

The embodiment shown in FIG. 5 exemplarily illustrates the concept of redirectable mirror units. Specifically, an adaptable mount 236 is schematically shown to be attached at the backside of reflector unit 206. Specifically, mount 236 may turn reflector unit 206 within a preset angular range, thereby also enforcing a movement of the "sun." Wall configuration 232 may be configured to provide respective remoteness of light beam portions 233A, 233B passing by reflector unit 206 for varying angular positions of reflector unit 206. Thus, one may achieve that the desired perception is not lost despite a change in the illumination condition assuming that light beam 203 is large enough to cover visible front area section 210A for any adjustable position. For example, turning reflector unit 206 around an axis 238, may result in pivoting range 207 along arrow 239, thereby resembling the movement of the sun for a stationary observer and, thus, strengthening the impression of sun-like illumination.

In other words, mount 236 acts as mechatronic mount system that is configured to mount the reflector unit and to produce an, in particular continuous, movement of the reflector unit to redirect the illuminating light beam into the ambience, thereby in particular resembling the movement of sun rays entering the ambience through a window, for example, for reproducing sunset, afternoon, and dawn sceneries, when, for example, further combined with a change in color of the light beam.

Moreover, the illumination system may be mounted in a non-stationary environment such as a ship, plane, or car, and the illumination system may use the mechatronic system having mounted the reflector unit and/or the light source thereon to compensate for movement of the non-stationary environment. For example, one may additionally provide an orientation detection device such as an accelerometer, a gravity sensor, and/or a tilt sensor for detecting a change in orientation such as inclination of the non-stationary environment such as a pitch and/or a roll of the ship. The control unit may be then configured to drive the mechatronic system to compensate for the change in orientation of the non-stationary environment, thereby in particular producing an illuminating light beam in counter-movement with respect to the non-stationary environment and in particular resembling the case of sunrays entering the non-stationary environment through a window.

In connection with FIGS. 1 and 5, embodiments of illumination systems were disclosed that may not require or may require only for some section(s) frame element(s). An alternative approach, which also may completely or at least partly make a frame element not required, is based on an ideal fit concept or an at least section-wise ideal fit concept of a light beam. The ideal fit concept matches the size and shape of the light beam at least partly to the visible front area section.

Specifically, in some illumination systems, additionally or alternatively, a matching of the first boundary (delimiting the visible front area section) and the second boundary (delimiting the light beam), specifically the lateral size of light beam, is performed at least for some part of the frame-like area.

The matching/adaptation may be performed using high precision mounts and/or specifically pre-designed light source and reflector unit geometries. However, in embodiments prone to relative movement, a control unit may additionally be provided to monitor and to continuously adjust/maintain the matching.

Figure 6:
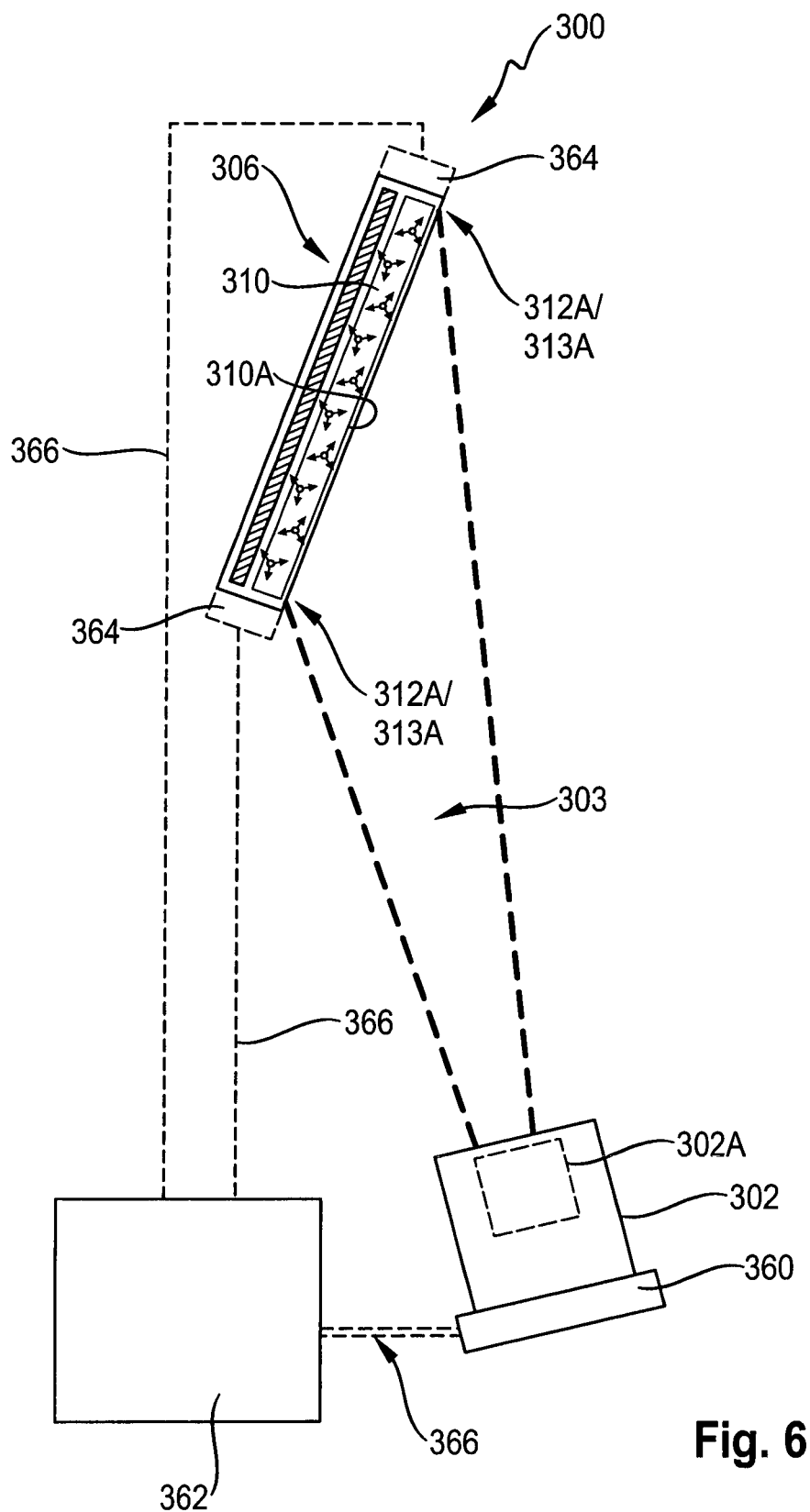
FIG. 6 is a schematic illustration of a further exemplary illumination system specifically illustrating the concept of a "perfect fit" configuration.

FIG. 6 illustrates exemplarily an ideal fit-based illumination system 300. Specifically, illumination system 300 comprises a light projector 302 with an optical system 302A to limit and to adapt a size of light beam 303. Optical system 302A may include, for example, a zoom lens system and/or a beam shape defining imaging system such as a fly's eye configuration, an essentially ideal CPC configuration, a transmissive aperture, and/or reflective aperture based imaging system upstream of a reflector unit 306. Optical system 302A may at least partly allow adapting the size and shape of light beam 303 and forming a second boundary 313A, which at least partly follows a first boundary 312A of reflector unit 306.

Illumination system 300 further comprises a high precision mount 360 for mounting and aligning light projector 302, and/or a tunable imaging system for adapting second boundary 313A (delimiting light beam 303) such that in particular at least 85%, for example in the range of 95%, of light beam 303 illuminate a visible front area section 310A of reflector unit 306 and that at the most 15%, for example in the range of 5%, of the light of light beam 303 fall outside of first boundary 312A.

High precision mount 360 may further be configured to mount reflector unit 306 (not shown in FIG. 6). In pre-installed embodiments, the relative position between reflector unit 306 and light source 302 may be fixed in dependence of the size of the light beam and the orientation and the position of the reflector unit. In some embodiments, continuous control may be required.

Illumination system 300 may further comprise a control unit 362 to control high precision mount 360 and/or to at least partly adapt optically second boundary 313A to first boundary 312A.

As a further modification shown in FIG. 6, reflector unit 306 may comprise, for example, light detectors 364 close to first boundary 312A for providing position information on second boundary 313A with respect to first boundary 312A. Control unit 362 may be connected to optical system 302A, high precision mount 360, and light detectors 364 via control lines 366 to control precision mount 360 and/or optical system 302A in response to the position information, thereby in particular ensuring proper and continuous alignment and matching of light beam 303 with a visible front area section 310A of a luminous layer 310 of reflector unit 306.

In ideal fit configurations, light source 302 is, for example, configured to produce a flat top illumination that is shaped in its boundary to fit to the visible front area section as seen from the light source's point of view.

In general, the light sources disclosed herein may comprise an optical system with an imaging optics that is based on an aperture. The image of the aperture is projected on the reflector unit by a projection optics and the shape of the aperture is tailored in order to match in general the frame-like area of the reflector unit (in case a frame element is present) or the size of the first boundary (in case ideal fit is used). The projection optics may use a lens or a system of lenses to create the image of an aperture on the reflector unit.

In some embodiments, the imaging optics may comprises a fly's eye lens array that is configured so that the second lens of each pair (of lenses) in the array produces the image of the first lens at distance (virtually infinite).

In some embodiments, the imaging optics may comprise an ideal CPC coupled with a light emitter fitting its entrance aperture (smaller aperture).

In the following, embodiments of seat illuminating systems in transportation units will be de-scribed in connection with a passenger car (FIGS. 7A to 9D) as well as in connection with an aircraft or train cabin (FIGS. 10 and 11).

Figure 7A:
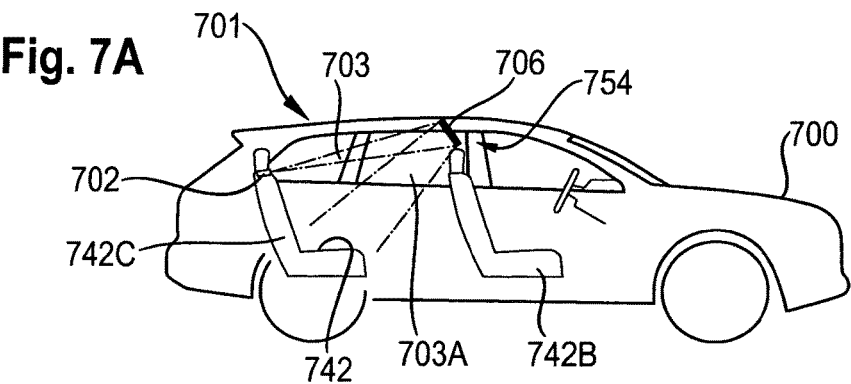
FIG. 7A to FIG. 7C are schematic illustrations of an exemplary installation of a rear seat illuminating system within a car.
Figure 7B:
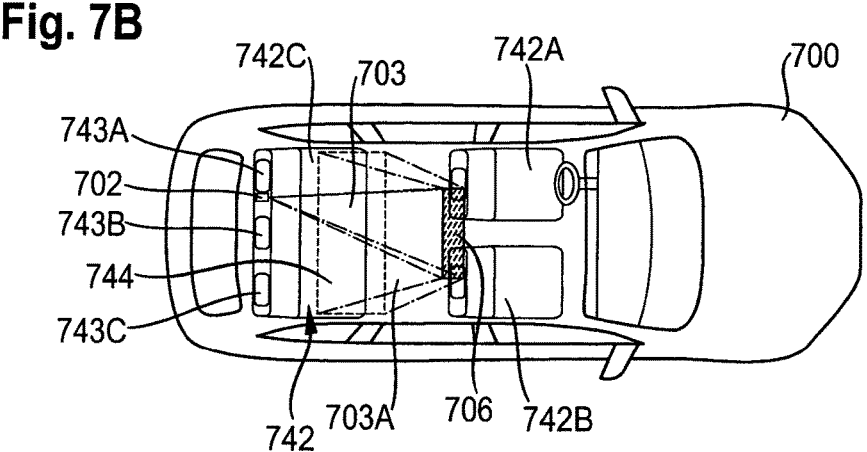
Figure 7C:
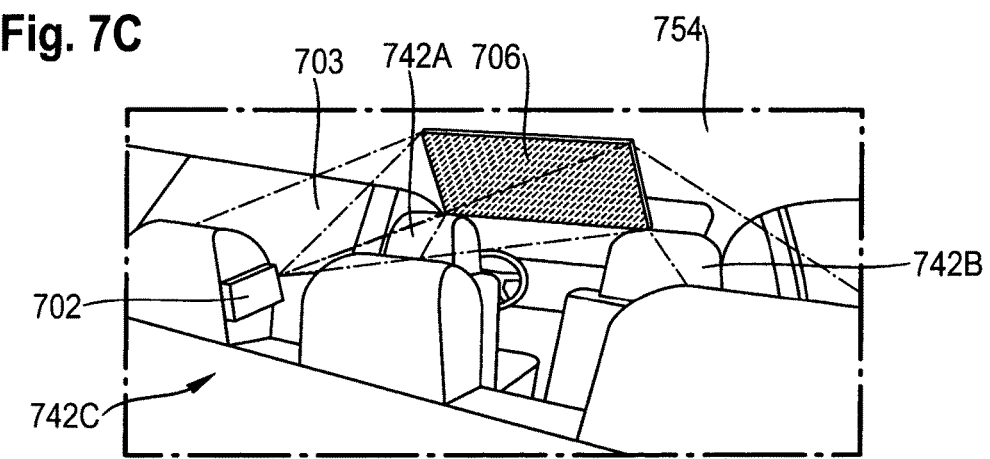

FIGS. 7A to 7C illustrate a rear seat illuminating system 701 for a passenger car 700. FIG. 7A is a simplified schematic side view, FIG. 7B is a simplified schematic top view, and FIG. 7C is a schematic view through the inside of car 700 from the back to the front.

Passenger car 700 comprises a driver seat 742A, a co-driver seat 742B, and a rear seat bench 742C providing, for example, seating possibilities for three passengers as indicated by headrests 743A, 743B, and 743C. Moreover, car 700 comprises a roof top providing a ceiling 754 that extends beyond seats 742A, 742B and rear seat bench 742C.

A reflector unit 706 is mounted to, for example, the head rests of driver seat 742A and/or co-driver seat 742B and/or ceiling 754. As shown in FIG. 7B, reflector unit 706 is tilted towards the rear seat bench 742C. Reflector unit 706 may be mounted in a pivotable manner, to fold up and down, when needed. Specifically, reflector unit 706 may be moved away from/toward to the roof with the opposite edge to switch between configurations where the passenger can look directly at the imitated "sun" to a configuration where the direct view at the projector pupil is prevented.

As further shown in FIG. 7B, a light source 702 is positioned next to one of headrests 743A to 743C and is configured to emit a light beam 703 onto reflector unit 706. In some embodiments, light source 702 may also be mounted to ceiling 754. After the reflection from reflector unit 706, an illuminating light beam 703A propagates from reflector unit 706 down to seat bench surface 742, on top of which a target area 744 is defined.

As can be seen in FIG. 7C, light beam 803 provides a forward directed illumination of reflector unit 706. Accordingly, to avoid any light leaving passenger car 700, a safety control of light beam 703 may be required, including further measures such as switching off light source 702 in case of misalignment, or providing light absorbing layers within the car windows (e.g. front shield) to allow only light to enter the inner of car 700 but not to transmit light of light beam 3 as well as light of illuminating light beam 703A out of the inner of car 700.

Moreover, as will be apparent to the skilled person, light beam 703 will be provided essentially in sections of the interior of car 700 in which a passenger's head usually will not be present, thereby avoiding potential interference of the passenger with light beam 703.

In addition, rear seat illuminating system 701 may comprise volumetric motion sensors to avoid operation of light source 702 when something, for example a head of a passenger, enters the space occupied by light beam 703.

Figure 8A:
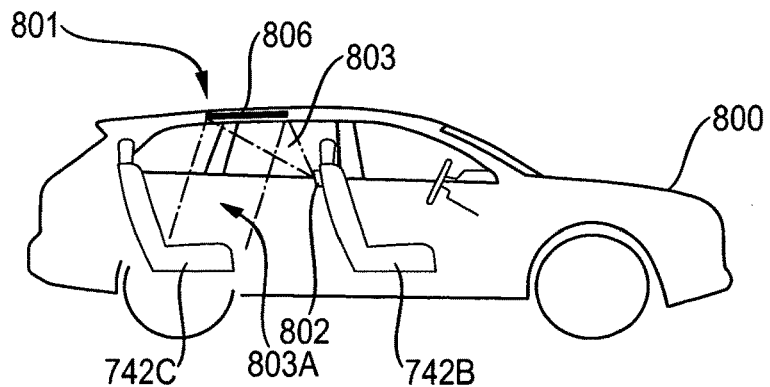
FIG. 8A to FIG. 8C are schematic illustrations of a exemplary installation of a rear seat illuminating system within a car.
Figure 8B:
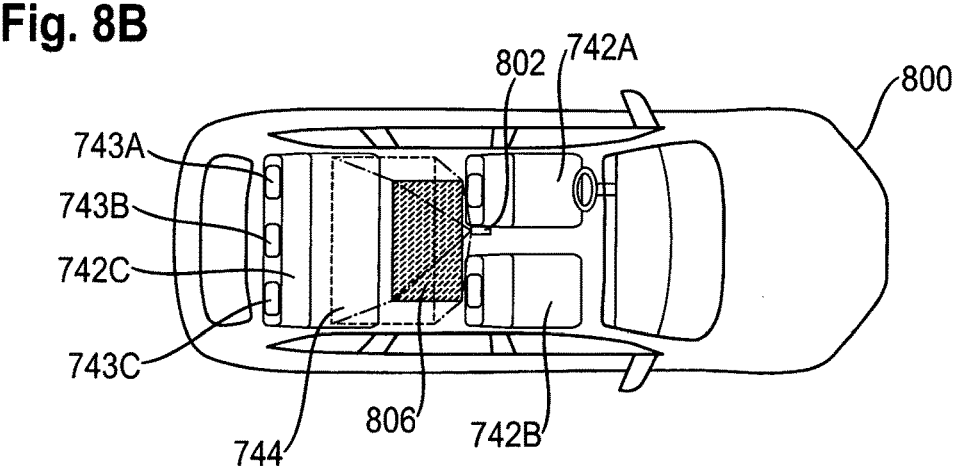
Figure 8C:
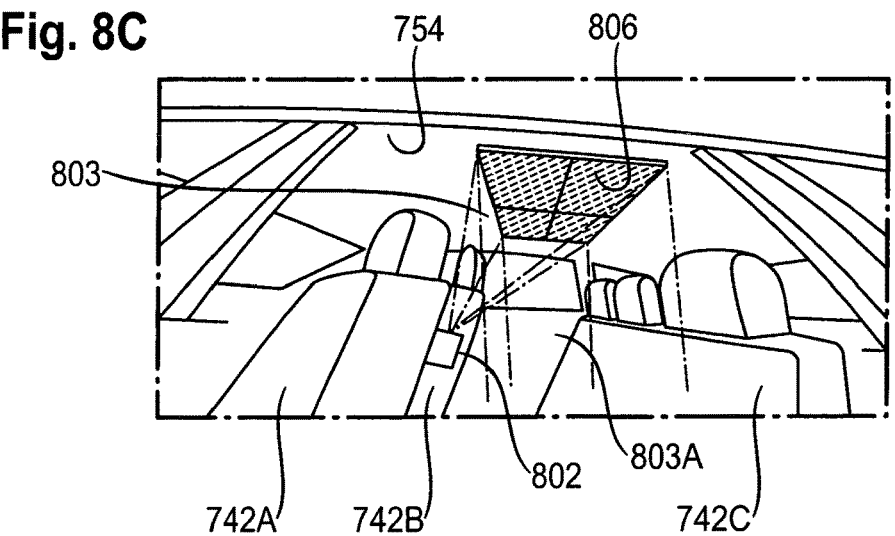

FIGS. 8A to 8C illustrate a rear sunroof configuration of a rear seat illuminating system 801 for a passenger car 800. FIGS. 8A and 8B are—as FIGS. 7A and 7B—simplified schematic side and top views, respectively. FIG. 7C is a schematic view across the inside of car 800 from the left to right. For simplifying of the disclosure, the reference numerals of FIG. 7 illustrate respective objects.

In contrast to the embodiment of FIGS. 7A to 7C, reflector unit 806 is positioned essentially above rear seat surface 742 of rear seat bench 742C, thereby being in the usual position of a rear seat sunroof.

Light source 802 may be positioned, for example, in between driver seat 742A and co-driver seat 742B. In some embodiments, the light source may be mounted next to headrests 743A to 743C.

In the embodiment of FIGS. 8A to 8C, light beam 803 illuminates reflector unit 806 from down to top, thus against ceiling 754 (in contrast to the embodiment shown in FIGS. 7A to 7C, in which a more forward directed illumination is provided). Ceiling 754 accordingly functions as a beam block such that even for some small scale misalignment of light beam 803, no light will leave the inner of car 800. The surface and/or structure of ceiling 754 may be configured as discussed above for frame-based embodiments.

In some embodiments, reflector unit 806 may be combined with a conventional sunroof installation, for example being retractable into a hidden position. For example, reflector unit 806 may be shaped to follow the curvature dictated by the respective sunroof configuration. Reflector panel 806 may be in the hidden position, in case the real sunroof is opened or, generally, in case no sunlight imitation is needed. In an extracted position, reflector unit 806 may be positioned before the conventional sunroof.

Figure 9A:
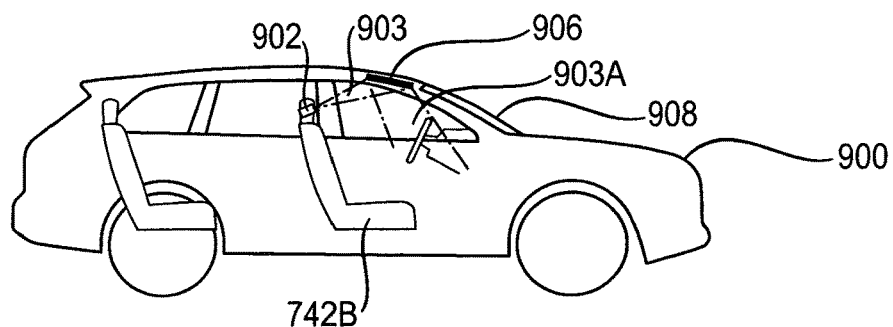
FIG. 9A to FIG. 9D are schematic illustrations of a further exemplary installation of a co-driver seat illuminating system within a car.
Figure 9B:
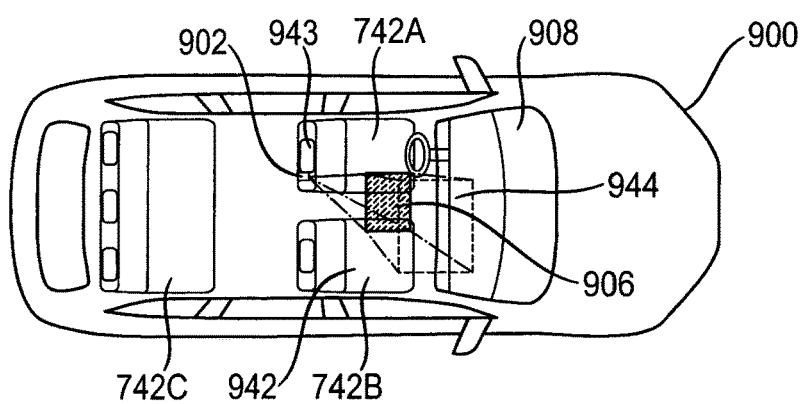
Figure 9C:
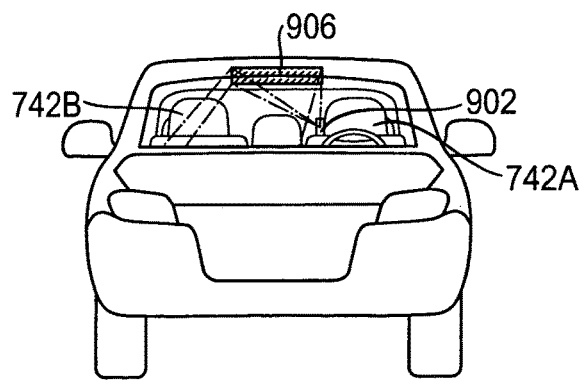
Figure 9D:
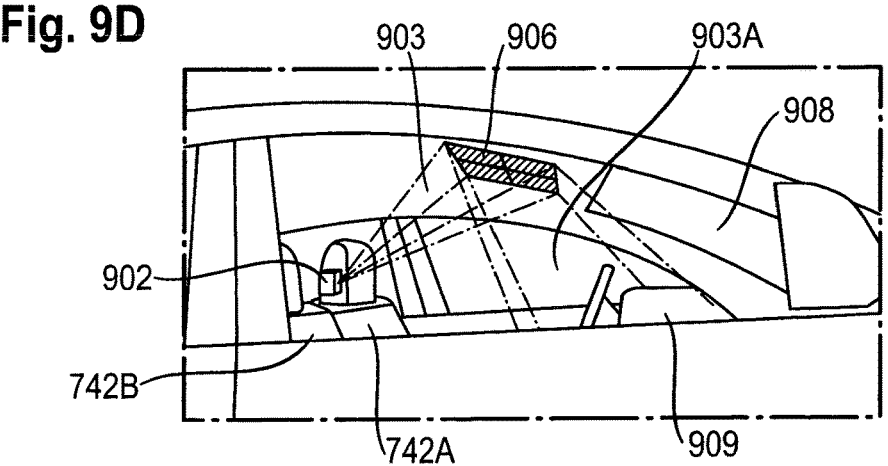

In FIGS. 9A to 9D, a passenger seat/passenger dashboard illuminating system 901 is shown. FIGS. 9A and 9B are—as FIGS. 7A and 7B—simplified schematic side and top views of a passenger car 900, respectively. FIG. 9C is a schematic front view of car 900, while FIG. 9D is a schematic side view from the right to the left in the front section of the car. For simplifying of the disclosure, the reference numerals of FIG. 7 illustrate respective objects.

Specifically, a reflector unit 906 is provided next to a front screen 980. Reflector unit 906 is configured and oriented such that a light beam 903, for example originating from a light source 902 mounted next to a head rest 943 of driver seat 742A or co-driver seat 742B, is redirected as an illuminating light beam 903A onto a target region 944. Target region 944 extends, for example, essentially on top of a co-driver seat's surface 942 and a section of the dashboard 909 at the co-driver's side.

Thus, the configuration shown in FIGS. 9A to 9D provides sunlight illumination reading conditions for the passenger sitting on co-driver seat 742B.

FIGS. 10 and 11 illustrate seat illuminating systems 1001, 1101 for conventional cabin layouts as used, for example, in trains and airplanes.

In a cabin 1052 of FIG. 10, an exemplarily pair of two seats 1042 is mounted next to a sidewall 1054. Sidewall 1054 may have window openings 1055 arranged therein and associated with seats 1042.

A luggage storage chamber 1056 extends overhead along sidewall 1054, thereby forming part of the roof structure of cabin 1052 in the area of seat 1042.

As shown in FIG. 10, a light source 1002 is provided at a mounting structure 1050 integrated into sidewall 1054. A reflector unit 1006 is integrated in a bottom part of overhead storage chamber 1056. Accordingly, reflector unit 1006 is illuminated from down to top and reflects light beam 1003 as respective illuminating light beam 1003A down to a target area 1044.

Although not shown in FIG. 10, a second light source may be provided next to light source 1002 for illuminating the neighboring seat using the same or a further reflector unit.

FIG. 11 illustrates an embodiment of a cabin 1152 with seats 1142, in which a reflector unit 1106 resembles to some extent a window of cabin 1152. For that purpose, respective reflector unit 1106 is provided at a sidewall 1154A of cabin 1152 or in a transition area (not shown) between sidewall 1154 and a face of a luggage storage chamber 1156.

One ore more light sources 1102 may be mounted at the bottom side or integrated into overhead storage chamber 1156, thereby allowing illumination of reflector unit 1106 from the side. The respective light beam path usually does not interfere with a passenger's head.

As an additional security measure, FIG. 11 illustrates a screen structure 1188 that may at least initially hide light source 1102 when guiding light beam 1103 towards reflector unit 706. Specifically, screen structure 1188 may reduce the possibility of a person within cabin 1152 to interfere with (e.g. reach into) light beam 1103 and, thereby, to affect the perception of reflector unit 1106. Screen structure 1188 could be a transparent (e.g. glass) cover or theca (even completely closed on all sides) to prevent people intrusion into light beam 1103.

In some embodiments, a cabin such as a train cabin or an airplane cabin may in some section not comprise any (real) windows and only provide reflector units for imitating sunlight illumination. For example, the reflector units may be positioned at the ceiling, the sidewall, and/or the transition there-between. In those configurations, the various illuminating light beams may be, for example, configured to propagate essentially in a parallel manner such that within the cabin a respective imitated "sun" position is associated with the section of the cabin.

As will be apparent to the skilled person, the shape of the reflector unit may be adapted to the shape of the inner walls of the cabin.

Figure 12A:
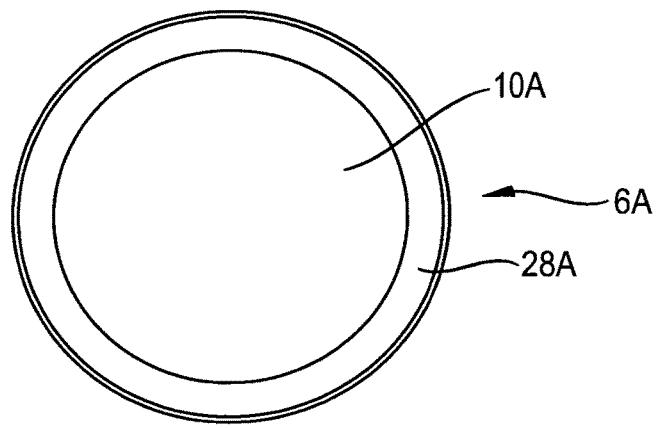
FIG. 12A and FIG. 12B are a front view and a schematic cross-section, respectively, of an exemplarily reflector unit with a frame in light trap configuration.
Figure 12B:
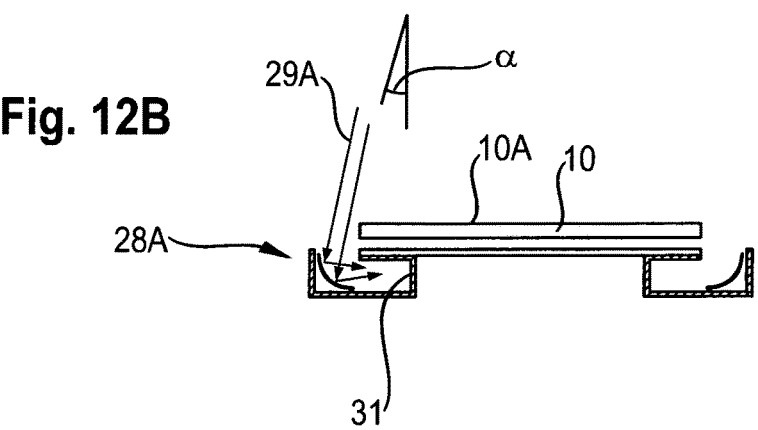
Figure 13:
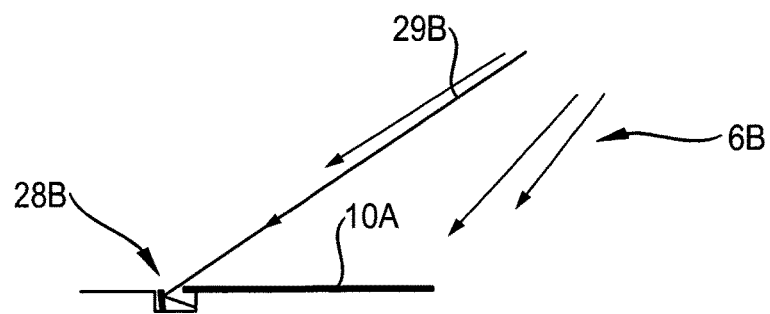
FIG. 13 is a schematic cross-section of a further exemplarily reflector unit with a frame in light trap configuration.

FIGS. 12A and 12B as well as FIG. 13 illustrate configurations of the frame element that remove—exemplarily in reference to illumination system 1 of FIG. 1—the light of light beam 3 that hits next to visible front area section 10A onto frame element 14.

Specifically, FIG. 12A (schematic front view) and FIG. 12B (schematic cross-sectional view) illustrate a light trap 28A for the case of near vertical incident light rays 29A (indicated by arrows) onto a circular reflector unit 6A. The incidence angles may be, for example, in the range from $\alpha=5°$ to 35°. Light trap 28A is configured as a reflective frame (e.g. mirror based redirecting frame) that is able to guide incoming light, e.g. at least a portion of light beam 3 falling out of visible front area section 10A, away. For example, light trap 28A may deflect and, thereby, may redirect any potentially spurious light towards a dark wall 31 within light trap 28A (the wall 31 having e.g. an absorptance as discussed above, e.g. of at least 60%). In addition or alternatively, light trap 28A may redirect the right/left behind reflector unit 6A. For a near orthogonal incidence, for example in the range from $\alpha=5°$ to 15°, essentially a rotation symmetric light trap 28A surrounding the visible front area section 10A may be provided as shown in FIG. 12A.

FIG. 13 illustrates an alternative embodiment of a reflective unit 6B with a frame element for use in particular in large angle incidence configurations in the range from $\alpha=55°$ to 70° (light rays 29B indicated again as arrows). As shown in FIG. 13, a light trap 28B is provided, for example, only at the downstream side of visible front area section 10A, again configured for guiding the light away, e.g. onto an absorbing surface within light trap 28B.

The light traps illustrated above are exemplary embodiments of frame elements that are at least partly recessed with respect to the visible front area section such as by comprising a recess such as a notch or a groove. The recess may in particular be configured to absorb the incident light on its wall surface(s).

In the respective embodiment of FIG. 13, upstream and top/down (left/right) of visible front area section 10A, no frame element may be provided, thereby either simply letting the respective section of the light beam pass behind reflector unit 6 and/or adapting the size and shape of the light beam accordingly.

Figure 14A:
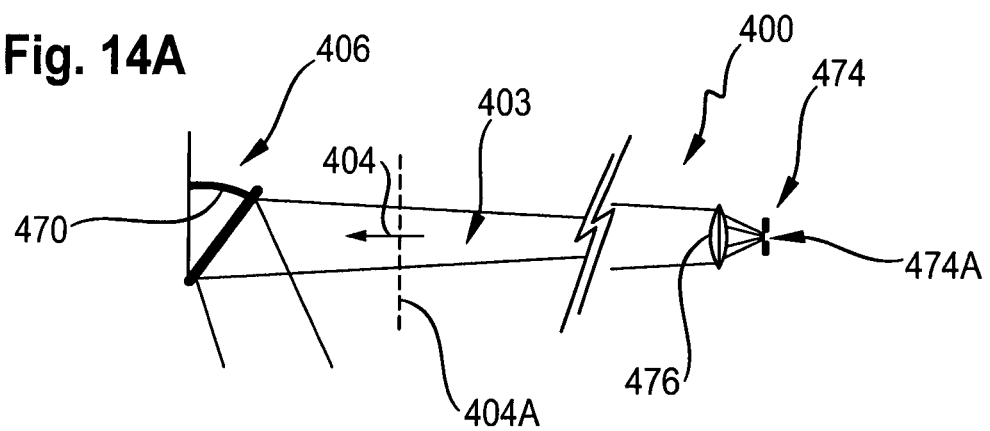
FIGS. 14A and 14B are schematic views illustrating an aperture-based ideal fit configuration.
Figure 14B:
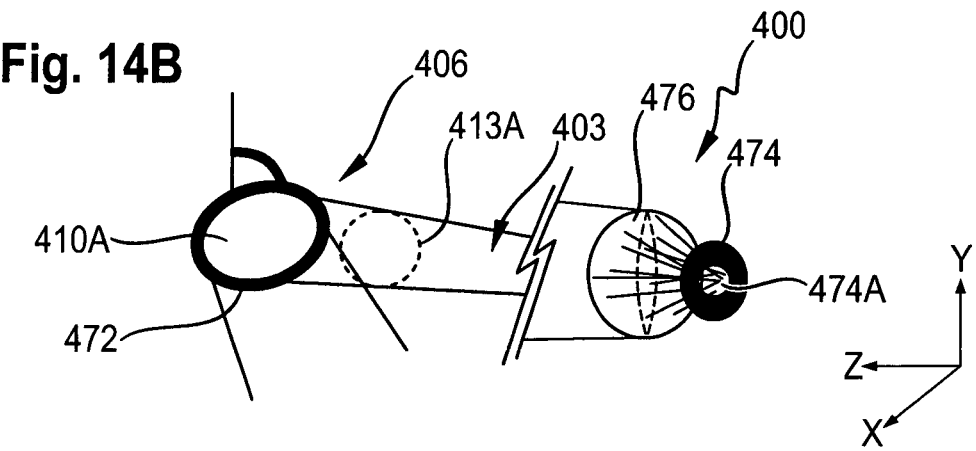

FIGS. 14A and 14B illustrate exemplary optical configurations that allow ideal fit implementations of an illumination system 400 as generally described in connection with FIG. 6.

In particular, FIG. 14A shows a cross section, while FIG. 14B shows a partially perspective view of a light beam propagation concept of complete illumination of a reflector unit 406 comprising a luminous layer set-up having exemplarily an essentially circular visible front area section 410A. A mounting structure 470 mounts a luminous layer 410 in a manner to at least partly surround visible front area section 410A. Mounting structure 470 may be any type of structural component for holding luminous layer 410 and may or may not comprise a mounting front side section 472. Mounting front side section 472 may not be specifically adapted to not be affected by illumination by a light beam 403 at its front side section 472 or it may, for precaution, be configured as disclosed above with respect to a frame element.

To allow such a flexibility with respect to the front side area surrounding visible front area section 410A, the ideal matching of the extension of light beam 403 to the extension of visible front area section 410A is used. For that purpose, light beam 403 may be configured as a flat top light beam for which a significant intensity only extends up to a second boundary 413A.

To generate such a beam shape, an aperture structure 474 comprises an opening 474A that in shape is identical to the projection of the tilted visible front area section 410A onto a plane 404A orthogonal to the main beam axis (direction 404). Besides the adaptation to the shape of that projection, the beam divergence is adjusted such that the size of the respective shapes are identical at the moment when light beam 403 hits reflector unit 406. The divergence is, for example, adaptable by a movable lens 476 arranged downstream of aperture structure 474. For example, lens 476 and/or aperture structure 474 are movable in axial direction (indicated as the Z-axis in FIG. 14B) as well as in lateral directions (indicated as X- and Y-axis in FIG. 14B). Mounting stages (not shown) for lens 476 and aperture structure 474 may be connected to a control unit (as shown in FIG. 6) and may be driven, for example, in response to control signals received by optical detectors next to visible front area section 410A or may be preset during initial installation.

Accordingly, the illustrated imaging system of FIGS. 14A and 14B allows adjusting the beam size and beam direction such that essentially only visible front area section 410A is illuminated. Thereby, an observer does not notice any light from light source 402 falling next to visible front area section 410A, which could affect any perception of the sun-like imitation, for example.

For the technology related to the luminous layers disclosed herein it is further referred to PCT/EP2012/072648, entitled "Artificial illumination device," filed on 14 Nov. 2012, and PCT/IB2013/060141, entitled "Artificial lighting system for simulating a natural lighting" by the same applicants the contents of which are herein incorporated in their entirety for illustration purposes of lighting systems using Rayleigh diffusers.

Although the Rayleigh diffusers of the herein disclosed embodiments are exemplarily shown in the drawings to be planar panel-shaped, thereby imitating a window appearance. However, although non-panel-like configurations may be used such as curved structures.

In general, the Rayleigh diffuser may be configured as a passive diffuser or a side-lit diffuser, e.g. a panel illuminated by, for example blue, LEDs from the side. Accordingly, the Rayleigh diffuser may in some embodiments be a secondary light source which emits diffuse light and is nevertheless partially transparent to the light of the (main) light source.

As indicated above, the luminous layer may be based on a passive luminous layer configurations, where the scattering of light of the light beam generates the diffuse light component. However, the luminous layer may be also based on an active luminous layer configuration comprising a secondary luminous layer specific light source configured to generate alone or at least to contribute to the generation of the diffuse light component. For example, the secondary light source or secondary light sources may direct light into the luminous layer from the side.

Figure 15:
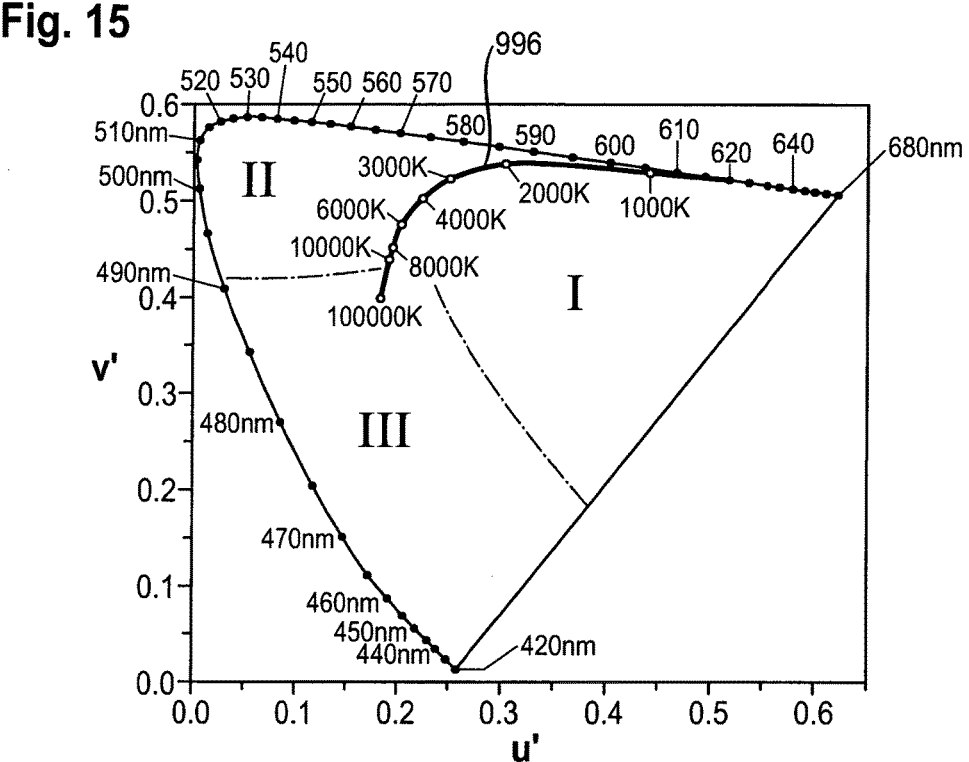
FIG. 15 is a schematic illustration of the color space.

FIG. 15 shows a schematic uniform chromaticity diagram (also referred to as u'-v'-chromaticity diagram). Therein, points on the border correspond to monochromatic spectra (delta-like); in other words, the wavelengths increase at the curved surface border on the left and top side from, for example, 420 nm at the bottom point to about 510 nm at the top left corner to about 680 nm at the right corner. The coordinates are referred to as u'-chromaticity coordinate and v'-chromaticity coordinate. In addition, a Planckian Locus 996 is indicated in FIG. 15 representing the spectrum of a Planck radiator at respective temperatures, for example, in the range from below 1000 K to about 100000 K. Planckian locus 996 further defines the CCT for the various temperatures.

In FIG. 15, color areas are schematically indicated. Specifically, the reddish area is referenced as I, the greenish area as II, and the bluish area as III. The reddish area and the greenish area are essentially separated by Planckian locus 996 in the range from 2000 K to 10000 K, Planckian locus 996 ending within the bluish area.

For a sun-like imitation, the color of the light beam (specifically the second color associated with the light beam after having passed the reflector unit) will be next to Planckian locus 996.

To provide for a respective difference between the first color and the second color resulting in the unique perception, the coordinates of the respective colors within the u'-v' uniform chromaticity diagram may differ at least in the range from a Δu'v' of at least 0.008 such as at least 0.01, 0.025, or 0.04. For example, providing the first color in the range of or at least close to Planckian locus 996 at about 70000 K to 10000 K will result in a blue sky impression and the sun appearing at the second color at e.g. a CCT of 800 K to 6500 K.

Artificial background effects may be achieved moving the first color away from Planckian locus 996, for example providing a greenish background.

Figure 16:
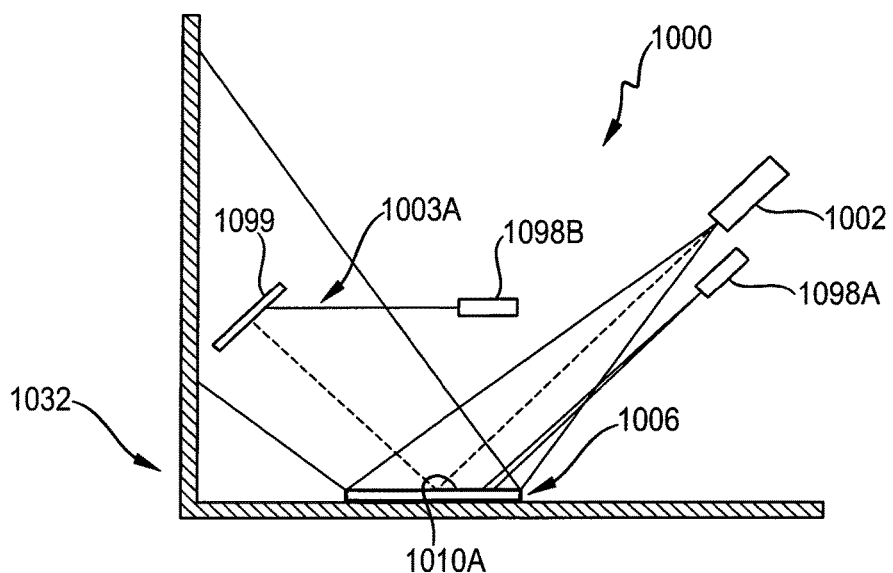
FIG. 16 is a schematic illustration of an exemplary color measurement in an illumination system.

In connection with FIG. 16, a configuration 1000 for measuring the respective colors of the diffuse light component and the directed light component of illuminating light beam 1003A is described. In the exemplary embodiment, an illumination of a reflector unit 1006 by a light source 1002 is performed under 45°. Reflector unit 1006 is mounted in a "dark" corner 1032, for example, in front of walls being colored black to absorb any scattering light, for example with an absorptance greater 90%.

As schematically illustrated in FIG. 16, the diffuse light component may be measured with a color spectrometer 1098A under 45° positioned outside of a light beam 1003, thereby not disturbing the illumination of visible front area section 1010A of reflector unit 1006 and collecting the first color information.

For measuring the second color of the direct light component, a white reference target 1099 (e.g. a Gray Card target with its 90% reflectivity, white side) is positioned within illuminating light beam 1003A in a sun-observer position and oriented perpendicularly to the main direction 1004A of illuminating light beam 1003A. A second color spectrometer 1098B is directed onto white reference target 1099 under 45° with respect to the normal of white reference target 1099, thereby collecting the second color information.

Although the above approach for color measurements of the illumination systems described herein may be applicable for many types of configurations, the skilled person will understand that similar or related configurations may also be used for identifying and measuring the respective colors, color differences, and correlated color temperatures.

For the technology of the luminous layer applied in the illumination systems disclosed herein it is further referred to PCT/EP2012/072648, entitled "Artificial illumination device," filed on 14 Nov. 2012 and PCT/IB2013/060141, entitled "Artificial lighting system for simulating a natural lighting" by the same applicants the contents of which are herein incorporated in their entirety for illustration purposes of lighting systems using Rayleigh diffusers.

For completeness, exemplary features of the luminous layer are summarized below. The luminous layer is, for example, shaped as a panel such as a parallelepiped panel. In particular, the panel may be delimited by two parallel surfaces and may be thin with a thickness, measured along a direction perpendicular to the surfaces, which has a square value not larger than 5%, for example not larger than 1%, of the area of the surfaces.

The luminous layer may be a Rayleigh panel which substantially does not absorb light in the visible range and which diffuses light in the blue wavelength range (around 450 nm) at least 1.2 times, for example at least 1.4 times, such as at least 1.6 times more efficiently than light in the red wavelength range around (around 650 nm), wherein a diffusion efficiency is given by the ratio between the diffuse light radiant power with respect the impinging light radiant power.

In some embodiments, luminous layer comprises a solid matrix of a first material (e.g., a resin or plastics having excellent optical transparency), in which nanoparticles of a second material (e.g. inorganic oxide such as ZnO, $TiO_2$, $ZrO_2$, $SiO_2$, $Al_2O_3$) are dispersed. The second material has a refractive index different from the first material's refractive index. Preferably, the first and the second material basically do not absorb electromagnetic radiation in the visible wavelength range.

Moreover, the luminous layer may be uniform, in the sense that, given any point of the luminous layer, the physical characteristics of the luminous layer in that point does not depend on the position of that point. Furthermore, the luminous layer may be monolithic.

In some embodiments, the spherically or otherwise shaped nanoparticles may be monodisperse and/or have an effective diameter D within the range [5 nm-350 nm], such as [10 nm-250 nm], or even [40 nm-180 nm], or [60 nm-150 nm], where the effective diameter D is given by the diameter of the nanoparticles times the first material's refractive index.

Moreover, nanoparticles may be distributed inside the luminous layer in a manner such that their areal density, namely the number N of nanoparticles per square meter, i.e. the number of nanoparticles within a volume element delimited by a portion of the surface of the luminous layer having an area of 1 m2, satisfies the condition N≥Nmin, where:

$$N_{min} = v \frac{10^{-29}}{D^6} \cdot \left|\frac{m^2+2}{m^2-1}\right|^2$$

wherein v is a dimensional constant equal to 1 meter6, Nmin is expressed as a number/meter2, the effective diameter D is expressed in meters and wherein m is the ratio between the particle and host medium refractive indices.

In some embodiments, the nanoparticles are distributed homogenously, at least as far as the areal density is concerned, i.e. the areal density is substantially uniform on the luminous layer, but the nanoparticle distribution may vary across the luminous layer. The areal density varies, for example, by less than 5% of the mean areal density. The aerial density is here intended as a quantity defined over areas larger 0.25 mm².

In some embodiments, the areal density varies, so as to compensate illumination differences over the luminous layer, as lit by the light source. For example, the areal density N(x,y) at point (x,y) may be related to the illuminance I(x,y) produced by the light source at point (x,y) via the equation N(x,y)=Nav*Iav/I(x,y)±5%, where Nav and Iav are the averaged illuminance and areal density, these latter quantities being averaged over the surface of the luminous layer. In this case the luminance of the luminous layer may be equalized, in spite of the non-uniformity of the illuminance profile of light source 2 on the luminous layer. In this context, the luminance is the luminous flux of a beam emanating from a surface (or falling on a surface) in a given direction, per unit of projected area of the surface as viewed from the given direction, and per unit of solid angle, as reported, as an example, in the standard ASTM (American Society for Testing and Materials) E284-09a.

In the limit of small D and small volume fractions (i.e. thick panels) an areal density N≈Nmin is expected to produce scattering efficiency of about 5%. As the number of nanoparticles per unit area gets higher, the scattering efficiency is expected to grow proportionally to N, until multiple scattering or interferences (in case of high volume fraction) occur, which might compromise color quality. The choice of the number of nanoparticles is thus biased by the search for a compromise between scattering efficiency and desired color, as described in detail in EP 2 304 478 A1. Furthermore, as the size of nanoparticles gets larger, the ratio of the forward to backward luminous flux grows, such ratio being equal to one in the Rayleigh limit. Moreover, as the ratio grows, the aperture of the forward scattering cone gets smaller. Therefore, the choice of the ratio is biased by the search for a compromise between having light scattered at large angles and minimizing the flux of backward scattered light. However, in a per se known manner, an antireflection layer (not shown) may be deposited on the luminous layer, with the aim of minimizing reflection.

In some embodiments, nanoparticles may not have a spherical shape; in such case, the effective diameter D can be defined as the effective diameter of the equivalent spherical particles, namely the effective diameter of spherical particles having the same volume as the aforementioned nanoparticles.

Furthermore, in some embodiments, the nanoparticles are polydispersed, i.e. their effective diameters are characterized by a distribution N(D). Such distribution describes the number of nanoparticles per surface unit and unit interval of effective diameter in a neighborhood of the effective diameter D (that is, the number of particles per surface unit having an effective diameter between D1 e D2 is equal to $$N_{D_2-D_1} = \int_{D_1}^{D_2} N(D)dD).$$

These effective diameters may fall in the range [5 nm-350 nm], i.e. the distribution may be non-null within this range. In this case, considering that scattering efficiency grows approximately, i.e. in the limit of small particles, with the sixth power of the nanoparticle's diameter, the polydisperse distribution behaves approximately as a monodisperse distribution with a representative diameter D'eff defined as:

$$D'_{eff} = \left\{\frac{\int N(D)D^6 dD}{N}\right\}^{1/6}$$

where $$N = \int N(D)dD$$

D'eff may by selected so as to lie within the range [5 nm-350 nm], preferably [10 nm-250 nm], more preferably [40 nm-180 nm], still more preferably [60 nm-150 nm].

In some embodiments, the natural quality of lighting improves whenever the maximum luminance of the light source is greater than 0.1*10⁶ cd/m², for example at least 1*10⁶ cd/m², or at least 5*10⁶ cd/m² or more. For those values, as a matter of fact, the light source generates enough glare for the source itself to be difficult to look at, thereby preventing the observer from evaluating the source's distance by means of the mechanism of eye focusing. Those luminance values contribute to obtain an infinite breakthrough effect. Moreover, glare makes it difficult to detect possible non-uniformities in the luminance profile of the light source, thus making it difficult to detect differences between the image of the light source and an image of the real sun.

In some embodiments, the exit aperture of the light source approximates a circle, the image of the light source perceived by the observer is still circularly shaped because the optical system does not twist the image. In some embodiments, the luminous layer has an elliptic shape illuminated, for example, by a light beam having circular divergence. However, other shapes are also possible, e.g. an elongated shape.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred embodiments of this invention have been described herein, improvements and modifications may be incorporated without departing from the scope of the following claims.

The invention claimed is:

1. A seat illuminating system for illuminating a target region by optically imitating natural sunlight illumination, the seat illuminating system comprising:
    a seat arrangement having a seat surface and a target region defined for a person sitting on the seat surface;
    a mounting structure spatially fixed with respect to the seat arrangement;
    a reflector unit mounted at the mounting structure and comprising a reflective surface and a luminous layer configured to diffuse at least some impinging light components to thereby homogenously emit diffuse light at a first color, wherein the luminous layer extends in front of the reflective surface and comprises a front area section of the reflector unit through which the diffuse light is emitted, wherein the front area section faces the target region and extends up to a first boundary; and
    a light projector mounted at the mounting structure, wherein the light projector is configured to generate a light beam that illuminates the entire front area section such that at least a portion of the light beam passes through the luminous layer before and after being reflected by the reflective surface, thereby forming an illuminating light beam at a second color directed onto the target region, the second color being associated with a direct light correlated color temperature,
    wherein the first color is associated with a diffuse light correlated color temperature that is larger than the direct light correlated color temperature of the illuminating light beam.

2. The seat illuminating system of claim 1, wherein the first color and the second color are separated in u'v'-color space by at least 0.008 or at least 0.02.

3. The seat illuminating system of claim 2, wherein the direct light correlated color temperature is close to the Planckian locus in the range from 800 K to 6,500 K.

4. The seat illuminating system of claim 1, wherein the seat arrangement comprises a seat and the target region covers at least partially a seat surface of the seat.

5. The seat illuminating system of claim 1, wherein the mounting structure comprises a section for mounting the reflector unit that extends on top of the seat arrangement such that the reflector unit is mounted at least partially above the seat arrangement.

6. The seat illuminating system of claim 1, wherein the seat arrangement comprises a seat frame that forms a section of the mounting structure to which at least one of the light projector and the reflector unit is mounted.

7. The seat illuminating system of claim 1, further comprising a frame element positioned in a frame area to form a frame area section of the reflector unit that extends outside of the front area section and at least partly along the first boundary, wherein the frame area is next to and surrounding the front area section, wherein the frame element is configured to essentially avoid contribution of the light portion of the light beam incident onto the frame area section to the illuminating light beam such that light of the light beam incident onto the frame area section is removed from the illumination system such that a light emission from the frame area is independent from the light beam of the light projector.

8. The seat illuminating system of claim 1, wherein
    the light projector comprises an optical system configured to adapt a size of the light beam thereby forming a second boundary which at least partly follows the first boundary.

9. The seat illuminating system of claim 8, wherein
    the mounting structure comprises a high precision mount configured to mount and align the light projector and/or the reflector unit;
    wherein the high precision mount is further configured to fix the relative position between the reflector unit and the light projector in dependence of the size of the light beam and the orientation and the position of the reflector unit; and
    wherein the seat illuminating system further comprises a control unit configured to control the high precision mount and/or the optical system to at least partly adapt the second boundary to the first boundary.

10. The seat illuminating system of claim 9, wherein the reflector unit comprises light detectors close to the first boundary for providing position information on the second boundary with respect to the first boundary, and the control unit is configured to control the precision mount and/or the optical system in response to the position information, thereby ensuring proper alignment of the light beam with the front area section.

11. The seat illuminating system of claim 1, wherein
    the luminous layer is configured to provide diffuse light at a diffuse light correlated color temperature in directions not contained in the illuminating light beam that is at least 1.2 times larger than the direct light correlated color temperature of the light of the illuminating light beam.

12. The seat illuminating system of claim 1, wherein
    the luminous layer comprises a Rayleigh diffuser panel.

13. The seat illuminating system of claim 1, wherein
    the light projector is configured to provide a light beam with a flat top intensity profile extending up to a second boundary.

14. The seat illuminating system of claim 1, further comprising a light screen positioned to at least partly surround the light beam upstream the reflector unit.

15. The seat illuminating system of claim 14, wherein the light screen comprises a curved screen or a shell to hide the light projector.

16. The seat illuminating system of claim 1, further comprising
    a volumetric-motion sensor configured to detect an intrusion of people inside a volume surrounding the light beam upstream the reflector unit, and
    a control unit configured to receive a respective signal from the volumetric-motion sensor, and to dim or to switch off any light emission from the light projector in case of an intrusion detection.

17. A passenger cabin of a transportation unit, the passenger cabin comprising:
    a floor structure, a sidewall structure, and a ceiling structure; and
    a seat illuminating system of claim 1.

18. The passenger cabin of claim 17, wherein
a structural configuration of the ceiling structure is configured at least partly as a frame element to absorb at least 60% of a light portion of the light beam incident onto the frame area section.

19. The passenger cabin of claim 17, further comprising a wall configuration comprising:
- a background wall section in front of which the reflector unit is positioned; and
- a light subjected wall section onto which light of the light beam passing by the reflector unit is incident, and
- wherein at least one of the background wall section and the light subjected wall section is provided with at least one of a light absorbing color, coarse grain structures, large structures, decorations, and patchy finishing.

20. A transportation unit comprising:
a passenger cabin of claim 17, wherein
the passenger cabin comprises a pair of seats, a roof structure, and at least one rear seat as the seat arrangement defining the target region,
the reflector unit is mounted to the roof structure in between the pair of seats,
the light projector is mounted at the roof structure or at the backrest of the rear seat and the light projector is further configured to project a light beam in forward direction onto the reflector unit, and
the reflector unit is configured to reflect the light beam onto the target region.

21. The seat illuminating system of claim 1, wherein the seat arrangement comprises a plurality of seats and a plurality of light projectors, and the plurality of light projectors illuminate a common reflector unit, thereby forming a plurality of illuminating light beams that are reflected onto respective target regions associated with respective seats.

22. The seat illuminating system of claim 1, wherein the reflector unit is tiltably mounted to the mounting structure.

23. The seat illuminating system of claim 1, wherein the reflector unit is mounted by a hinge or a joint at one side to a roof structure to thereby provide an adjustable angle of reflection and an adjustability of the illuminating light beam with respect to the target region.

24. The seat illuminating system of claim 1, wherein the luminous layer does not absorb light in the visible range.

25. The seat illuminating system of claim 1, wherein the luminous layer being configured to diffuse at least some impinging light components includes being configured to diffuse impinging light components of relatively shorter wavelength more efficiently than impinging light components of relatively longer wavelength.

26. The seat illuminating system of claim 1, wherein the luminous layer being configured to diffuse at least some impinging light components includes:
- being configured to diffuse light from a secondary light source; or
- being configured to diffuser light from both the secondary light source and from the light projector.

* * * * *